United States Patent
Lee

(10) Patent No.: US 11,537,315 B2
(45) Date of Patent: Dec. 27, 2022

(54) APPARATUS AND METHOD FOR ERASING DATA PROGRAMMED IN A NON-VOLATILE MEMORY BLOCK IN A MEMORY SYSTEM

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 180 days.

(21) Appl. No.: 16/678,771

(22) Filed: Nov. 8, 2019

(65) Prior Publication Data
US 2020/0225867 A1  Jul. 16, 2020

(30) Foreign Application Priority Data
Jan. 11, 2019 (KR) .................. 10-2019-0003825

(51) Int. Cl.
*G11C 16/04* (2006.01)
*G06F 3/06* (2006.01)

(52) U.S. Cl.
CPC .......... *G06F 3/0652* (2013.01); *G06F 3/0608* (2013.01); *G06F 3/0673* (2013.01)

(58) Field of Classification Search
CPC .... G06F 3/0652; G06F 3/0608; G06F 3/0673; G11C 16/04; G11C 5/147; G11C 5/063; G11C 7/1006; G11C 7/16; G11C 11/403; G11C 2207/104; G06N 3/063; G06N 3/0635; G06N 3/08; G06N 3/0454; H01L 27/1225; H01L 27/1255; H01L 29/7869; H01L 29/786
USPC ..................................................... 365/185.29
See application file for complete search history.

(56) References Cited

U.S. PATENT DOCUMENTS

| | | | | |
|---|---|---|---|---|
| 5,796,657 A | * | 8/1998 | Lee | H01L 27/115 257/E27.103 |
| 6,967,869 B1 | * | 11/2005 | Kolokowsky | G06F 12/0246 365/185.11 |
| 8,520,435 B2 | * | 8/2013 | Choi | G11C 16/3445 365/185.11 |
| 9,355,737 B2 | * | 5/2016 | Shirakawa | G11C 16/16 |
| 9,552,885 B2 | * | 1/2017 | Shukla | G11C 11/5628 |
| 9,564,189 B2 | * | 2/2017 | Han | G11C 11/5628 |
| 9,575,839 B2 | * | 2/2017 | Hong | G06F 11/1435 |
| 2009/0244976 A1 | * | 10/2009 | Kajimoto | G11C 11/5635 365/185.11 |
| 2009/0296471 A1 | * | 12/2009 | Goda | G11C 11/5635 365/185.11 |
| 2010/0290292 A1 | * | 11/2010 | Tanizaki | G11C 16/3445 365/185.22 |

(Continued)

FOREIGN PATENT DOCUMENTS

| | | |
|---|---|---|
| KR | 10-2011-0074644 | 7/2011 |
| KR | 10-2016-0039018 | 4/2016 |

*Primary Examiner* — Harry W Byrne
(74) *Attorney, Agent, or Firm* — IP & T Group LLP

(57) ABSTRACT

A memory system includes a memory device having a plurality of memory blocks for storing data, and a controller configured to perform an erase operation including plural unit erase operations to erase data stored in at least one target memory block included in the plurality of memory blocks. The controller can be configured to perform at least some of the plural unit erase operations onto the at least one target memory block before the at least one target memory block allocated for storing data.

12 Claims, 15 Drawing Sheets

(56) References Cited

U.S. PATENT DOCUMENTS

| | | | |
|---|---|---|---|
| 2011/0122696 A1* | 5/2011 | Kajimoto | G11C 11/5628 |
| | | | 365/185.11 |
| 2016/0329084 A1* | 11/2016 | Han | G11C 13/0069 |
| 2018/0203613 A1* | 7/2018 | Tanzawa | H01L 27/11582 |
| 2019/0303024 A1* | 10/2019 | Iwai | G06F 3/0679 |

\* cited by examiner

APPARATUS AND METHOD FOR ERASING DATA PROGRAMMED IN A NON-VOLATILE MEMORY BLOCK IN A MEMORY SYSTEM

CROSS-REFERENCE TO RELATED APPLICATION

This patent application claims priority under 35 U.S.C. § 119(a) to Korean Patent Application No. 10-2019-0003825, filed on Jan. 11, 2019, the entire disclosure of which is incorporated herein by reference.

TECHNICAL FIELD

The disclosure relates to a memory system, and more particularly, to a method and apparatus for erasing data in a nonvolatile memory block of the memory system.

BACKGROUND

Recently, the paradigm for a computing environment has shifted to ubiquitous computing, which enables computer systems to be accessed anytime and anywhere. As a result, the use of portable electronic devices, such as mobile phones, digital cameras, notebook computers and the like, are rapidly increasing. Such portable electronic devices typically use or include a memory system that uses or includes at least one memory device, i.e., as a data storage device. The memory system can be used as a main storage device or an auxiliary storage device of a portable electronic device.

Unlike a hard disk, a memory system using a nonvolatile semiconductor memory device is advantageous in that it has excellent stability and durability because it has no mechanical driving parts (e.g., a mechanical arm), and has high data access speed and low power consumption. In the context of a memory system having such advantages, an exemplary data storage device includes a universal serial bus (USB) memory device, a memory card having various interfaces, a solid-state drive (SSD) or the like. In a conventional memory system, a controller may perform whole unit erase operations during a single erase operation cycle for completely erasing a single memory block.

BRIEF DESCRIPTION OF THE DRAWINGS

The description herein makes reference to the accompanying drawings wherein like reference numerals refer to like parts throughout the figures, and wherein.

DETAILED DESCRIPTION

Figure 1:
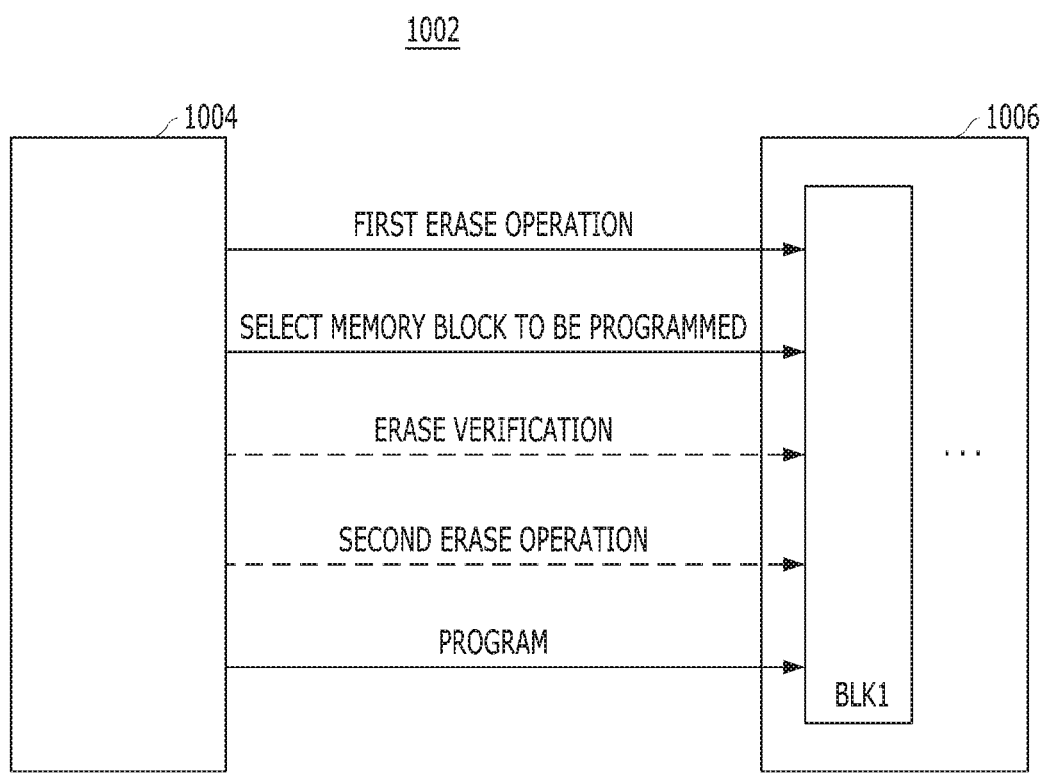
FIG. 1 illustrates a memory system in accordance with an embodiment of the disclosure.

Various embodiments of the disclosure are described below in more detail with reference to the accompanying drawings. Elements and features of the disclosure, however, may be configured or arranged differently to form other embodiments, which may be variations of any of the disclosed embodiments. Thus, the present invention is not limited to the embodiments set forth herein. Rather, the described embodiments are provided so that this disclosure is thorough and complete, and fully conveys the scope of the disclosure to those skilled in the art to which this invention pertains. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could also be termed a second or third element in another instance without departing from the spirit and scope of the invention.

The drawings are not necessarily to scale and, in some instances, proportions may have been exaggerated to clearly illustrate features of the embodiments.

When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art, and should not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

An embodiment of the invention can provide a memory system, a data processing system, and an operation method, capable of quickly and reliably processing data for a memory device by reducing operational complexity and performance degradation of the memory system and enhancing usage efficiency of the memory device.

In addition, an embodiment of the disclosure can provide a method and an apparatus for avoiding occurrence of latency in programming large-volume data due to a time required for erasing a plurality of blocks, including data that is no longer valid, in a process of securing plural free blocks to be programmed with the large-volume data.

In addition, an embodiment of the disclosure can provide a method for checking and controlling states of plural blocks for a program operation before the program operation is performed onto the plural blocks for storing voluminous data in a memory device so that a time required to perform an operation such as wear levelling or garbage collection can be reduced. Thus, it is possible to provide a method and a device that can improve or enhance efficiency and stability of the memory device.

In addition, an embodiment of the disclosure can provide a method and an apparatus which can determine, measure and control a state of a memory block (e.g., lifespan) more accurately by variably determining an erase count that is incremented after data stored in the memory block is erased by an erase operation including plural erase unit operations.

In an embodiment, a memory system can include a memory device including a plurality of memory blocks for storing data; and a controller configured to perform an erase operation including plural unit erase operations to erase data stored in at least one target memory block included in the plurality of memory blocks. The controller can be configured to perform at least some of the plural unit erase operations onto the at least one target memory block before the at least one target memory block is allocated for storing data.

By way of example but not limitation, the controller does not perform an erase verification onto the at least one target memory block directly after performing the at least some of the plural unit erase operations.

The at least some of the plural unit erase operations performed by the controller can include 80 to 90% of the erase operation. The controller can be configured to perform the remaining 10 to 20% of the erase operation onto the at least one target memory block when the at least one target memory block is allocated for storing the data. The controller is configured to perform the erase verification to check whether the at least one target memory block is erased.

The controller can be configured to perform all of the plural unit erase operations onto the at least one target memory block before the at least one target memory block is allocated for storing data even when no command is entered from a host.

The controller does not perform an erase verification onto the at least one target memory block directly after performing all of the plural unit erase operations.

The controller can be configured to perform an erase verification onto the at least one target memory block after at least one target memory block is allocated for storing the data, and perform an additional unit erase operation when the at least one target memory block is not completely erased.

The controller can be configured to determine a first timing of performing the erase operation onto the at least one target memory block and a second timing of allocating the at least one target memory block for storing the data. The first timing can antecede the second timing.

The controller can be configured to individually determine a timing of performing the erase operation onto plural target memory blocks, and to determine a timing of allocating the plural target memory blocks for storing the data at the same time.

The controller can be configured to stop performing the at least some of the plurality unit erase operations onto the at least one target memory block until the at least one target memory block is allocated for storing the data, when a power is not supplied from a host.

In another embodiment, a controller in a memory system can include a target block selector configured to select at least one memory block among a plurality of memory blocks as at least one target block; a target block manager configured to determine whether the at least one target memory block is used for storing data; and an erase performer configured to perform an erase operation including plural unit erase operations to erase the at least one target memory block and to perform at least some of the plural unit erase operations onto the at least one target memory block before the at least one target memory block is determined to be used for storing the data.

The controller may further include an erase state verifier configured to check whether the at least one target memory block is erased.

In another embodiment, a method for operating a memory system may include selecting at least one memory block among a plurality of memory blocks as at least one erase target block; performing a first erase operation to erase the at least one erase target block; and allocating one or more program target blocks among the at least one erase target block for storing data after the first erase operation is performed.

The method may further include checking whether the one or more program target block is completely erased; and performing a second erase operation on the one or more program target blocks based on a checking result.

The method may further include performing a second erase operation onto the one or more program target block.

The first erase operation may include 80 to 90% of an operation for erasing a memory block, and the second erase operation may include the remaining 10 to 20% of the operation for erasing the memory block.

The first erase operation may be performed onto the at least one erase target memory block before the at least one erase target memory block is allocated as the at least one program target block for storing data even when no command is entered from a host.

An erase verification cannot be performed onto the at least one erase target memory block directly after the first erase operation.

The first erase operation may be performed onto plural erase target memory blocks at different timings or for different ends. Accordingly, a level of maximum power or peak current may be reduced as well as an operational margin for the first erase operation may be adaptable or flexible so that performance of the memory system can be improved. The second erase operation can be performed onto the plural erase target memory blocks sequentially or at substantially the same time.

In another embodiment, a memory system can include a memory device including a plurality of memory blocks configured to store data; and a controller configured to control the memory device to perform a unit erase operation for a first number of times on each of one or more erase target blocks selected among the memory blocks; and control the memory device to perform the unit erase operation for a second number of times on each of one or more program target blocks selected among the erase target blocks.

Embodiments of the disclosure will now be described in detail with reference to the accompanying drawings, wherein like numbers reference like elements.

FIG. 1 illustrates a memory system according to an embodiment of the disclosure.

Referring to FIG. 1, the memory system 1002 may include a controller 1004 and a memory device 1006. The memory device 1006 may include a first block BLK1 requiring an operation of erasing data stored therein in order to store new data. Although not shown, the memory device 1006 may include a plurality of memory blocks including a closed block in which all pages may be programmed with data, an open block in which a page may be used for programming data or a free block in which data may be ready to be programmed.

The plurality of memory blocks in the memory device 1006 may be implemented as nonvolatile memory cells. In this case, the plurality of memory blocks may not support a data overwrite operation. Therefore, if a piece of data has never been recorded in a nonvolatile memory cell of the memory block, new data can be programmed in the nonvolatile memory cell of the memory block. However, to program new data in a nonvolatile memory cell of a memory block after programming data in the nonvolatile memory cell previously, an operation for erasing the nonvolatile memory cell needs to be performed before new data can be programmed in the same location of the memory device 1006. In FIG. 1, the first block BLK1 is shown as an example where it is necessary to erase data which is no longer valid before new data is programmed therein.

In a conventional memory system, an erase operation is performed onto a memory block immediately before (or directly before) a program operation for newly storing data in the memory block which is selected among a plurality of memory blocks in the memory device. If the erase operation is performed onto the memory block long before a program operation for new data is performed onto the memory block, threshold voltage distribution of nonvolatile memory cells in the memory block can be gradually widened over time, due to charge loss and charge acquisition. The widened threshold voltage distribution may cause an error during the program operation. For this reason, in the conventional memory system, an erase operation is performed onto a memory block immediately before (or directly before) a program operation is performed onto the memory block capable of newly programming data, so that the memory system can avoid or reduce an error caused by a threshold voltage distribution that changes over time.

However, when large volume data (voluminous data) is to be programmed in a memory device, requiring a plurality of memory blocks, a conventional memory system performs an erase operation onto the plurality of memory blocks immediately before programming large volume data onto the plurality of memory blocks which may delay the program operation, i.e., increase its latency. Particularly, an erase operation may take a longer time than a read operation or a program operation in a memory device including nonvolatile memory cells. Therefore, when a large amount of time is required to erase the plurality of memory blocks in the process of programming a large amount of data in the memory device, a program operation of the memory system may be slowed down. This can greatly affect the operational reliability and performance of the memory system.

According to an embodiment, when the data in at least one memory block in the memory device 1006 can be erased (i.e., the data is no longer used), the memory system 1002 performs an erase operation onto the at least one memory block in advance regardless of whether or not the at least one memory block is about to be reused (e.g., newly programming data). Thus, latency that may occur due to performing an erase operation onto a plurality of memory blocks immediately before they are to be programmed may be avoided or reduced.

Although not shown, in the following embodiments of the disclosure, the following points may be assumed. For example, there may be a first timing point when the controller 1004 determines that data stored in a specific memory block is no longer valid and an erase operation may be performed onto the specific memory block. That is, the controller 1004 may determine the memory block as a free block or an empty block because all data programmed in the memory block in the memory device 1006 is no longer valid at the first timing point. In addition, there may be a second timing point when the controller 1004 selects the memory block determined as a free block or an empty block to newly program data. That is, at a second timing point, the memory system can determine whether to use a specific memory block storing invalid data only among a plurality of memory blocks in the memory device 1006 for newly programming data. For example, at the second timing point, a program command is inputted with a large amount of data from a host (see FIGS. 2 to 3) which is operatively engaged with the memory system 1002, and then the controller 1004 tries to secure a plurality of memory blocks corresponding to a size of voluminous data in the memory device 1006 in order to perform the program command. Further, there may be a third timing point when the controller 1004 newly programs data in the memory block secured at the second timing point.

In a conventional memory system, an operation of erasing a memory block is performed between the second timing point and the third timing point. However, in an embodiment of the disclosure, a specific memory block can be erased regardless of a second timing point when it is determined to use the specific memory block for newly programming data. For example, the controller 1004 can erase the specific memory block between the first timing point and the second timing point. Hereinafter, embodiments of the disclosure may be described with reference to the first, second and third timing points.

According to an embodiment, the controller 1004 may perform a first erase operation and/or a second erase operation on memory blocks in the memory device 1006. The first erase operation may be performed onto at least some memory blocks, which store only invalid data, between the first timing point and the second timing point, that is, before the controller 1004 selects a specific memory block to newly program data. In addition, in the first erase operation, after applying an erase pulse for erasing a specific block, the controller 1004 may not check whether the specific block is erased. That is, the first erase operation may not include an operation of applying an erase verification pulse to a memory block for confirming whether data stored therein has been erased after applying at least one erase pulse to the memory block. Even when the first erasing operation includes a plurality of unit erase operations, the controller 1004 may not check whether a memory block is erased after the unit erase operations or between the unit erase operations.

On the other hand, the second erase operation may be performed onto a specific memory block only between the second timing point and the third timing point, that is, after the controller 1004 selects a specific memory block for a subsequent program operation. Also, in the second erase operation, an erase verification pulse for checking whether data stored in the specific memory block is erased after an erase pulse may be applied to the specific memory block. When the second erase operation includes a plurality of unit erase operations, the controller 1004 may check whether the specific memory block is erased after the unit erase operations or between the unit erase operations.

As described above, the first erase operation and the second erase operation differ in view of operation timing, a range of memory blocks as a target of the erase operations, or whether an erase verification is performed after the erase operations. The first erase operation is a type of preliminary operation for reducing a time taken by the second erase operation. The second erase operation is a type of substantial or primary erase operation of erasing a memory block as well as adjusting a threshold voltage distribution of memory cells in the memory within a preset range in order to avoid an error during a next program operation or a subsequently performed program operation.

In an embodiment, the first erase operation may be performed longer than the second erase operation for a single memory block. For example, when the first erase operation and the second erase operation include a plurality of unit erase operations to be performed on a single memory block, the number of unit erase operations performed on a single memory block in one cycle may be different. In a conventional memory system, a controller may perform 100 unit erase operations during one erase operation cycle for completely erasing a single memory block. In an embodiment of the disclosure, the first erase operation may be performed through 90 unit erase operations on a single memory block during one cycle, and the second erase operation may be performed through the remaining 10 unit erase operations on the single memory block during one cycle. In another embodiment, the first erase operation may include 80 unit erase operations on a single memory block in one cycle, and the second erase operation may include the remaining 20 unit erase operations on the single memory block in one cycle.

In the memory system 1002 according to an embodiment of the disclosure, the sum of the number of the unit erase operations included in the first erase operation and the second erase operation during an erase operation is substantially the same with the number of the unit erase operations performed during an erase operation in the conventional memory system. However, in an embodiment of the disclosure, the number of unit erase operations performed in the first erase operation may be greater than that of the second erase operation in order to reduce a time taken for an erase operation performed immediately before a program operation.

According to another embodiment, when 100 unit erase operations are performed in the first erase operation, a single unit erase operation may be performed in the second erase operation. In another embodiment, the sum of the number of unit erase operations of the first erase operation and the second erase operation constituting one erase operation for erasing a specific block may be more than 100 times. For example, threshold voltage distribution of memory cells in a specific block may change a long time after the controller 1004 performs a 100% first erase operation which is sufficient to erase the specific block. In this case, the second erase operation including a few unit erase operations may be performed for a very short time to adjust or correct the threshold voltage distribution of the memory cells in the specific block.

Referring to FIG. 1, the controller 1004 may perform a first erase operation for erasing the first block BLK1. According to an embodiment, the controller 1004 may not check whether the first block BLK1 is completely erased after the first erase operation. That is, the controller 1004 may perform a first erase operation onto the first block BLK1 between the first timing point and the second timing point, and may not check whether the first block BLK1 is erased. Here, the first erase operation may be performed as a background operation of the memory system 1002 regardless of a command from the host.

According to an embodiment, the controller 1004 receives a program command with a large amount of data that can be stored in a plurality of blocks in the memory device 1006 from the host, and then selects a first block BLK1 among a plurality of memory block in the memory device 1006 to store the large amount of data in response to the program command. This operation may be performed at a timing point of determining a memory block selected among a plurality of blocks to program data, that is, at the second timing point of determining whether to use a specific memory block and when to use the specific memory block.

After the second timing point of determining whether to use the specific memory block and when to use the specific memory block, the controller 1004 may check whether the specific memory block is erased. According to an embodiment, the controller 1004 may check whether the first block BLK1 has been erased before storing the data in the first block BLK1 between the second timing point and the third timing point. After the controller 1004 checks whether the first block BLK1 is erased, the controller 1004 can determine whether the second erase operation is performed onto the first block BLK1.

When the first block BLK1 is erased, the controller 1004 may program data in the first block BLK1 in response to a program command of the host without performing the second erasing operation onto the first block BLK1. Unnecessarily performing the second erase operation when the first block BLK1 is erased may cause deterioration of memory cell characteristics of the first block BLK1. Thus, when the first block BLK1 is ready to newly program data, it is not necessary to perform the second erase operation onto the first block BLK1.

If the first block BLK1 is not erased, the controller 1004 may erase the first block BLK1 by performing the second erase operation. Also, the controller 1004 may check whether the first block BLK1 is erased after performing the second erase operation. When the first block BLK1 is erased through the second erase operation, the controller 1004 may newly program data in the first block BLK1 in response to a program command entered from the host.

In another embodiment, when the first erase operation may partially erase a specific memory block or the first erase operation may be set to erase partial data stored in the specific memory block, the controller 1004 immediately performs the second erase operation without checking an erase state of the specific memory block after selecting the specific memory block for a program operation. For example, the first erase operation may use less than a predetermined range of resources required for erasing data remaining in the first block BLK1. Specifically, an erase pulse should be applied for a period of 12 to 20 ns to erase data remaining in the first block BLK1, an erase pulse is applied to the first block BLK1 for a period shorter than 10 ns in the first erase operation so as to not completely erase the data remaining in the first block BLK1. After the first block BLK1 is selected for a next or following program operation to newly program data, the second erase operation may be performed without checking whether the first block BLK1 is erased. When the specific memory block is erased through the second erase operation, the controller 1004 may newly program data in the specific memory block in response to a program command inputted from the host. Through these processes, a time for performing erase and program operations can be shortened or reduced.

Also, even if the first block BLK1 is completely erased through the first erasing operation performed before the use of the first block BLK1 is determined, threshold voltages of memory cells are included in the first block BLK1 after a time passes. According to an embodiment, when a predetermined range of time elapses from the time when the first erase operation is done, the controller 1004 may perform the second erase operation onto the first block BLK1 before newly programming data in the first block BLK1 without checking an erase state of the first block BLK1. For example, if a timing point when the first erasing operation is completed onto the first block BLK1 is recorded, the elapsed time can be checked when the use of the first block BLK1 is determined. The second erase operation may be performed in response to the elapsed time without an operation of checking whether the first block BLK1 has been erased.

Figure 2:
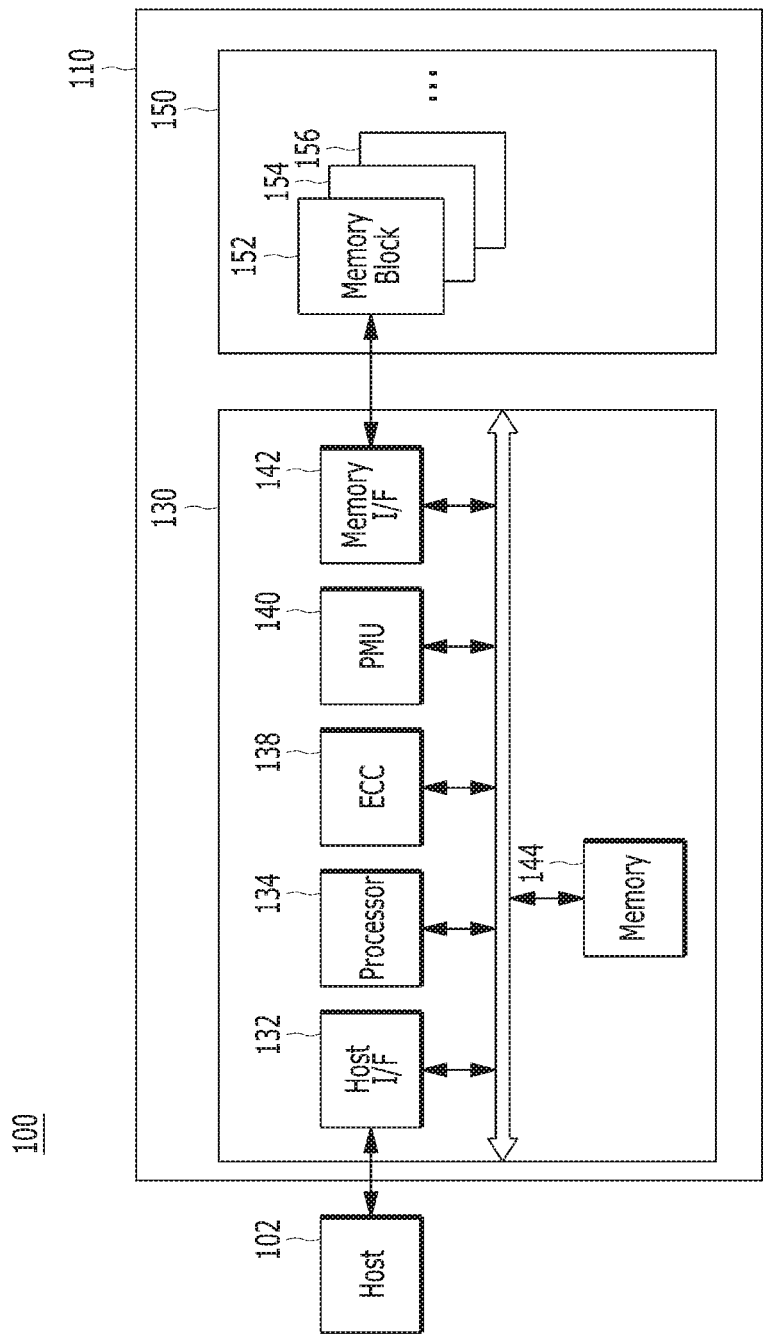
FIG. 2 shows a data processing system including a memory system coupled to a host in accordance with an embodiment of the disclosure.

FIG. 2 illustrates a data processing system 100 in accordance with an embodiment of the disclosure. Referring to FIG. 2, the data processing system 100 may include a host 102 engaged or interlocked with a memory system 110.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally manage and control, functions and operations performed in the host 102. The OS may provide interoperability between the host 102 engaged with the memory system 110 and the user needing and using the memory system 110. The OS may support functions and operations corresponding to a user's requests. By way of example but not limitation, the OS may be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described later, in reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid-state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be integrated into an SSD for improving an operation speed. When the memory system 110 is used as an SSD, the operating speed of the host 102 connected to the memory system 110 may be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (e.g., SM, SMC), a memory stick, a multimedia card (e.g., MMC, RS-MMC, MMCmicro), a secure digital (SD) card (e.g., SD, miniSD, microSD, SDHC), a universal flash memory or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program, and erase operations. For example, the controller 130 may control the memory device 150 in response to a request from the host 102. The controller 130 may provide the data, read from the memory device 150, to the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through a firmware called a host interface layer (HIL).

The ECC component 138 may correct error bits of the data to be processed in (e.g., outputted from) the memory device 150, which may include an ECC encoder and an ECC decoder. Here, the ECC encoder may perform error correction encoding of data to be programmed in the memory device 150 to generate encoded data into which a parity bit is added and to store the encoded data in memory device 150. The ECC decoder may detect and correct errors contained in a data read from the memory device 150 when the controller 130 reads the data stored in the memory device 150. That is, after performing error correction decoding on the data read from the memory device 150, the ECC component 138 may determine whether the error correction decoding has succeeded and output an instruction signal (e.g., a correction success signal or a correction fail signal). The ECC component 138 may use the parity bit which is generated during the ECC encoding process, for correcting the error bit of the read data. When the number of error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check (LDDC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC component 138 may include all circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a Flash Interface Layer (FIL) as a component for exchanging data with the memory device 150.

The memory 144 may support operations performed by the memory system 110 and the controller 130. The memory 144 may store temporary or transactional data which occurred or was delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 exemplifies the second memory 144 disposed within the controller 130, the invention is not limited thereto. That is, the memory 144 may be located within or external to the controller 130. For instance, the memory 144 may be embodied by an external volatile memory having a memory interface transferring data and/or signals between the memory 144 and the controller 130.

The memory 144 may store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 may control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-levelling and the like. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programmed page) due to a characteristic of a flash memory device. Further, the controller 130 may store map data of the new data into the FTL.

When performing an operation requested from the host 102 in the memory device 150, the controller 130 uses the processor 134. The processor 134 may handle instructions or commands corresponding to a command received from the host 102. The controller 130 may perform a foreground operation as a command operation, corresponding to an command received from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation includes an operation of copying and storing data stored in a memory block among the memory blocks 152, 154, 156 in the memory device 150 to another memory block, e.g., a garbage collection (GC) operation. The background operation may include an operation of moving or swapping data stored in at least one of the memory blocks 152, 154, 156 into at least another of the memory blocks 152, 154, 156, e.g., a wear levelling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In accordance with an embodiment, the error check circuitry 38 of FIG. 1 may be implemented through at least one processor 134 of the controller 130 in FIG. 2. For example, when the error check circuitry 38 includes firmware, the firmware may be performed by at least one processor 134 after loading in at least one memory 144 of the controller 130 in FIG. 2.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 may determine which channels) or way(s) among a plurality of channels (or ways) for connecting the controller 130 to a plurality of memory dies included in the memory device 150 is/are proper or appropriate for performing each operation. The controller 130 may transmit data or instructions via determined channels or ways for performing each operation. The plurality of memory dies included in the memory device 150 may transmit an operation result via the same channels or ways, respectively, after each operation is complete. Then, the controller 130 may transmit a response or an acknowledge signal to the host 102. In an embodiment, the controller 130 may check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 may recognize statuses regarding a plurality of channels (or ways) associated with a plurality of memory dies included in the memory device 150. The controller 130 may determine the state of each channel or each way as one of a busy state, a ready state, an active state, an idle state, a normal state and/or an abnormal state. The controller 130 may determine which channel or way an instruction (and/or a data) is delivered through, based on a physical block address, e.g., which die(s) the instruction (and/or the data) is delivered into. The controller 130 may refer to descriptors delivered from the memory device 150. The descriptors may include parameters or information stored in a block or page, which can describe something about the memory device 150. The descriptors may be divided into plural pieces of data with a predetermined format or structure. For instance, the descriptors may include device descriptors, configuration descriptors, unit descriptors, and the like. The controller 130 may refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation (or the program operation), due to characteristics of a NAND logic function. During the bad block management, the data of the program-failed memory block or the bad memory block may be programmed into a new memory block. The bad blocks may seriously aggravate the utilization efficiency of the memory device 150 having a three-dimensional (3D) stack structure and the reliability of the memory system 110. Thus, reliable bad block management may enhance and improve performance of the memory system 110.

Figure 3:
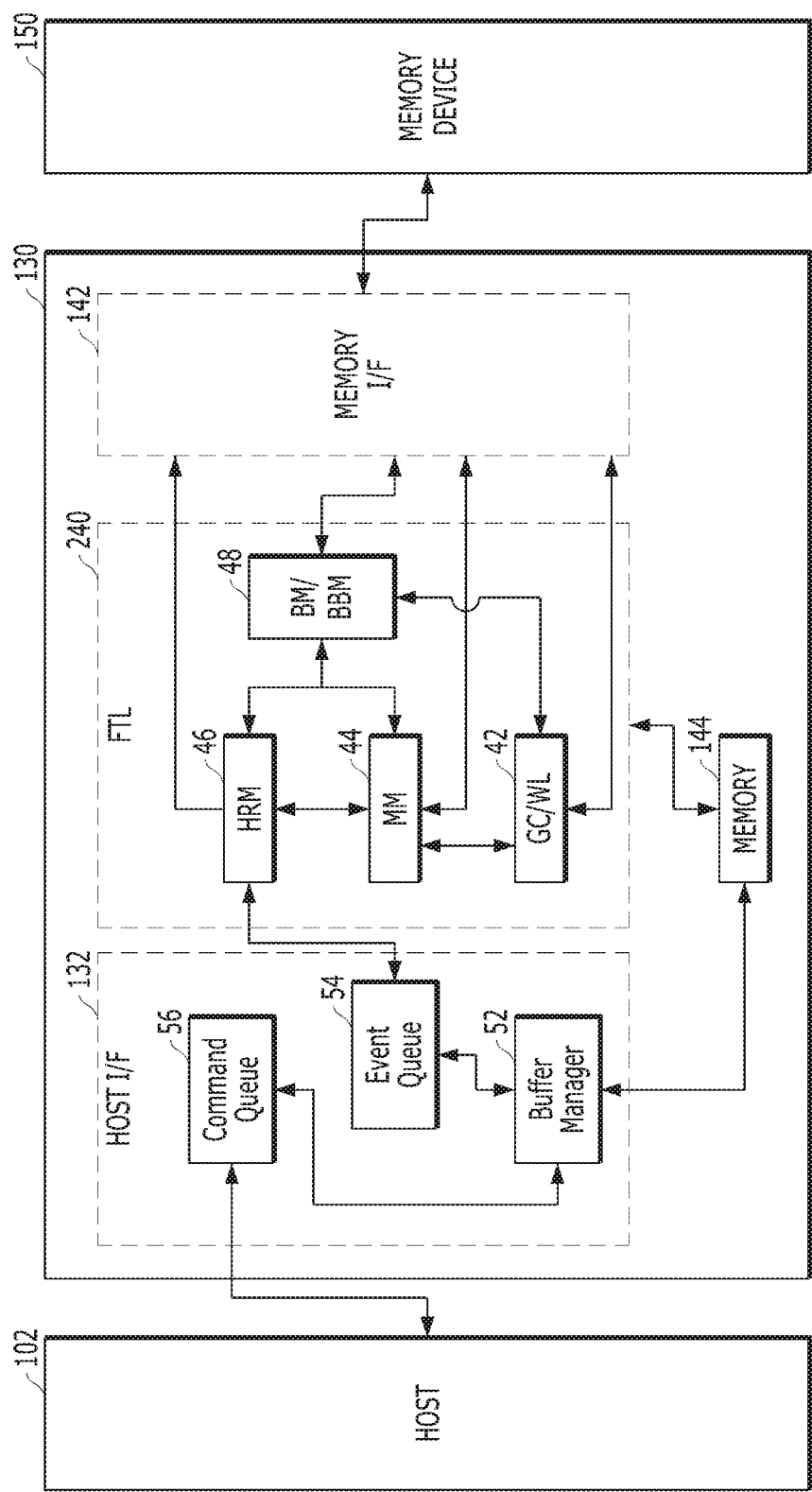
FIG. 3 illustrates a memory system in accordance with an embodiment of the disclosure.

FIG. 3 shows a controller 130 of a memory system in accordance with an embodiment of the disclosure.

Referring to FIG. 3, the controller 130 in a memory system in accordance with another embodiment of the disclosure is described in detail. The controller 130 cooperates with the host 102 and the memory device 150. The controller 130 includes a host interface (I/F) 132, a memory interface (I/F) 142, a memory 144, and a flash translation layer (FTL) 240.

Although not shown in FIG. 3, the ECC component 138 of FIG. 2 may be included in the FTL 240. In another embodiment, the ECC component 138 may be implemented as a separate module, a circuit, a firmware or the like, which is included in, or associated with, the controller 130.

The host interface 132 may handle commands, data, and the like received from the host 102. By way of example but not limitation, the host interface 132 may include a buffer manager 52, an event queue 54 and a command queue 56. The command queue 56 may sequentially store commands, data, and the like received from the host 102 and output them to the buffer manager 52 in a stored order. The buffer manager 52 may classify, manage or adjust the commands, the data, and the like, which are delivered from the command queue 56. The event queue 54 may sequentially transmit events for processing the commands, the data, and the like received from the buffer manager 52.

A plurality of commands and/or data of the same characteristic may be continuously received from the host 102. Alternatively, a plurality of commands and/or data of different characteristics may be received from the host 102, after being mixed or jumbled. For example, the host 102 may transmit a plurality of commands for reading data (i.e., read commands). For another example, the host 102 may alternatively transmit commands for reading data (i.e., read command) and programming/writing data (i.e., write command). The host interface 132 may store commands, data, and the like, which are received from the host 102, to the command queue 56 sequentially. Thereafter, the host interface 132 may estimate or predict what type of operation the controller 130 will perform according to the characteristics of the command, data, and other relevant information which is received from the host 102. The host interface 132 may determine a processing order and a priority of commands and data, based at least on their characteristics. According to characteristics of commands and data, the buffer manager 52 of the host interface 132 is configured to determine whether the buffer manager 52 should store commands and data in the memory 144, or whether the buffer manager 52 should deliver the commands and the data to the FTL 240. The event queue 54 receives events, entered from the buffer manager 52, which are to be internally executed and processed by the memory system 110 or the controller 130 in response to the commands and the data, so as to deliver the events to the FTL 240 in the order received.

In accordance with an embodiment, the host interface 132 and the memory interface 142 of FIG. 3 may perform functions of the controller 130 described in FIG. 1 such as an operation performed by the interface 36.

In accordance with an embodiment, the FTL 240 may include a state manager 42, a map manager (MM) 44, a host request manager (HRM) 46, and a block manager (BM or BBM) 48. The host request manager 46 may manage the events entered from the event queue 54. The map manager 44 may handle or control map data. The state manager 42 may perform garbage collection or wear levelling. The block manager 48 may execute commands or instructions on a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map manager 44, to determine a physical address corresponding to the logical address which is entered with the events. The host request manager 46 may send a read request with the physical address to the memory interface 142, to process the read request (or handle the events). On the other hand, the host request manager 46 may send a program request (or write request) to the block manager 48, to program entered data to a specific page of the unrecorded (no data) in the memory device 150. Then, the host request manager 46 may transmit a map update request corresponding to the program request to the map manager 44, to update an item relevant to the programmed data in information of mapping the logical-to-physical addresses to each other.

The block manager 48 may convert a program request delivered from the host request manager 46, the map manager 44, and/or the state manager 42 into a flash program request used for the memory device 150, to manage flash blocks in the memory device 150. In order to maximize or enhance program or write performance of the memory system 110 of FIG. 2, the block manager 48 may collect program requests and send flash program requests for multiple-plane and one-shot program operations to the memory interface 142. It is plausible that the block manager 48 sends several flash program requests to the memory interface 142 to enhance or maximize parallel processing of the multi-channel and multi-directional flash controller (i.e., the memory interface 142).

The block manager 48 may be configured to manage blocks in the memory device 150 according to the number of valid pages. Further, the block manager 48 may select and erase blocks having no valid pages when a free block is needed, and select a block including the least valid page when it is determined that garbage collection is necessary. The state manager 42 may perform garbage collection to move the valid data to an empty block and erase the blocks containing the moved valid data so that the block manager 48 may determine that there are enough free blocks (i.e., empty blocks with no data) in the memory device 150. If the block manager 48 provides information regarding a block to be erased to the state manager 42, the state manager 42 could check all flash pages of the block to be erased to determine whether each page is valid. For example, to determine validity of each page, the state manager 42 may identify a logical address stored in an area (e.g., an out-of-band (OOB) area) of each page. To determine whether each page is valid, the state manager 42 may compare the physical address of the page with the physical address mapped to the logical address obtained from the inquiry request. The state manager 42 sends a program request to the block manager 48 for each valid page. A mapping table may be updated through the update of the map manager 44 when the program operation is completed.

The map manager 44 may manage a logical-to-physical mapping table. The map manager 44 may process requests such as queries, updates, and the like, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made, and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) is not completed normally, the map manager 44 may not perform the mapping table update. It is because the map request is issued with old physical information if the state manger 42 requests a map update and a valid page copy is completed later. The map manager 44 may perform a map update operation to ensure accuracy only if the latest map table still points to the old physical address.

In accordance with an embodiment, the state manager 42 may include the garbage collection control circuitry 196 shown in FIG. 1.

The memory device 150 may include a plurality of memory blocks. The plurality of memory blocks may be classified into different types of memory blocks such as a single level cell (SLC) memory block, a multi-level cell (MLC) memory block or the like, according to the number of bits that can be stored or represented in one memory cell of the block. The SLC memory block includes a plurality of pages implemented by memory cells, each storing one bit of data. The SLC memory block may have high data input and output (I/O) operation performance and high durability. The MLC memory block includes a plurality of pages implemented by memory cells, each storing multi-bit data (e.g., two bits or more). The MLC memory block may have larger storage capacity in the same space than the SLC memory block. The MLC memory block may be highly integrated in terms of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory or a NOR flash memory. But, in another embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
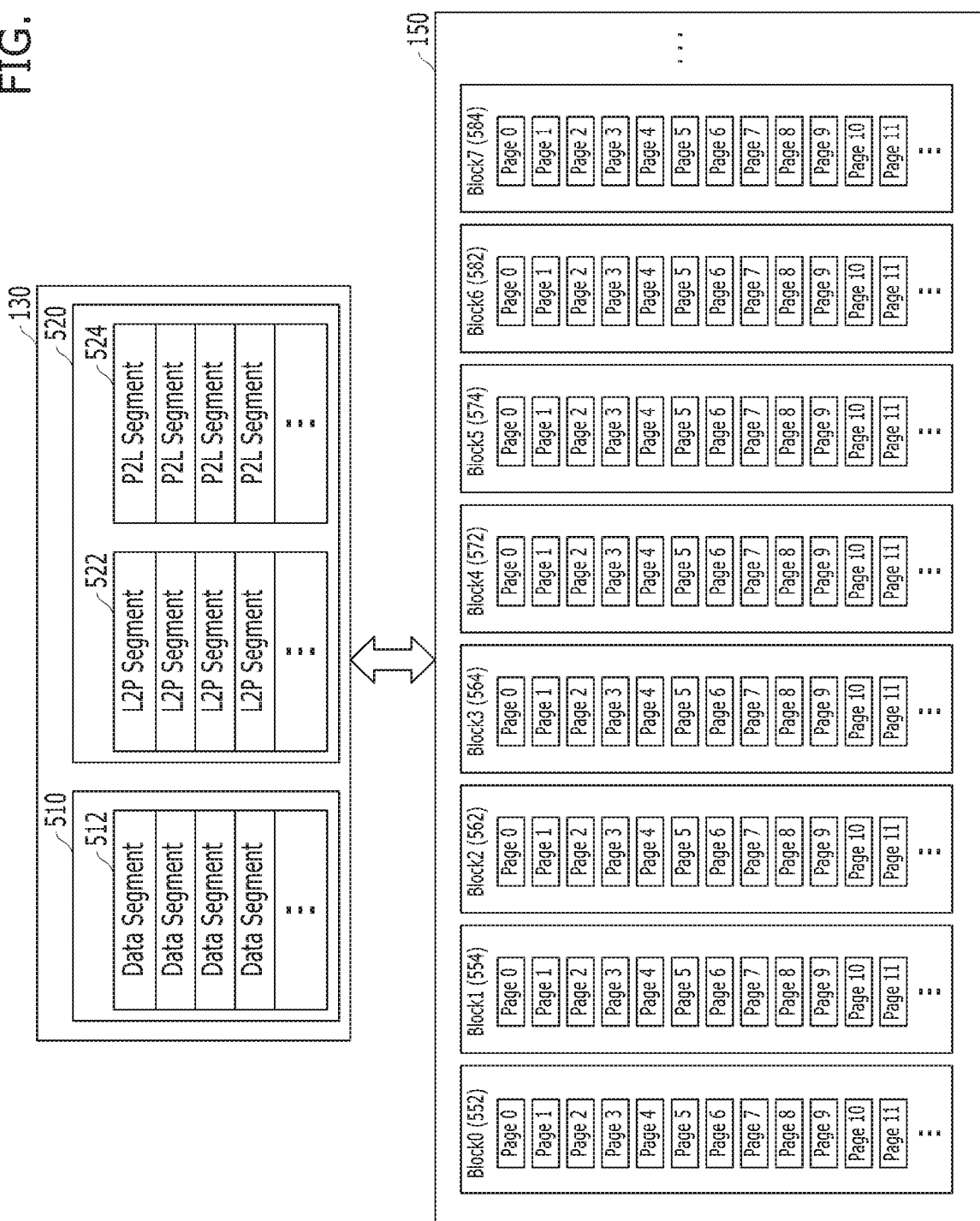
FIGS. 4 to 5 are diagrams illustrating command operations of a memory system in accordance with embodiments of the disclosure.
Figure 5:
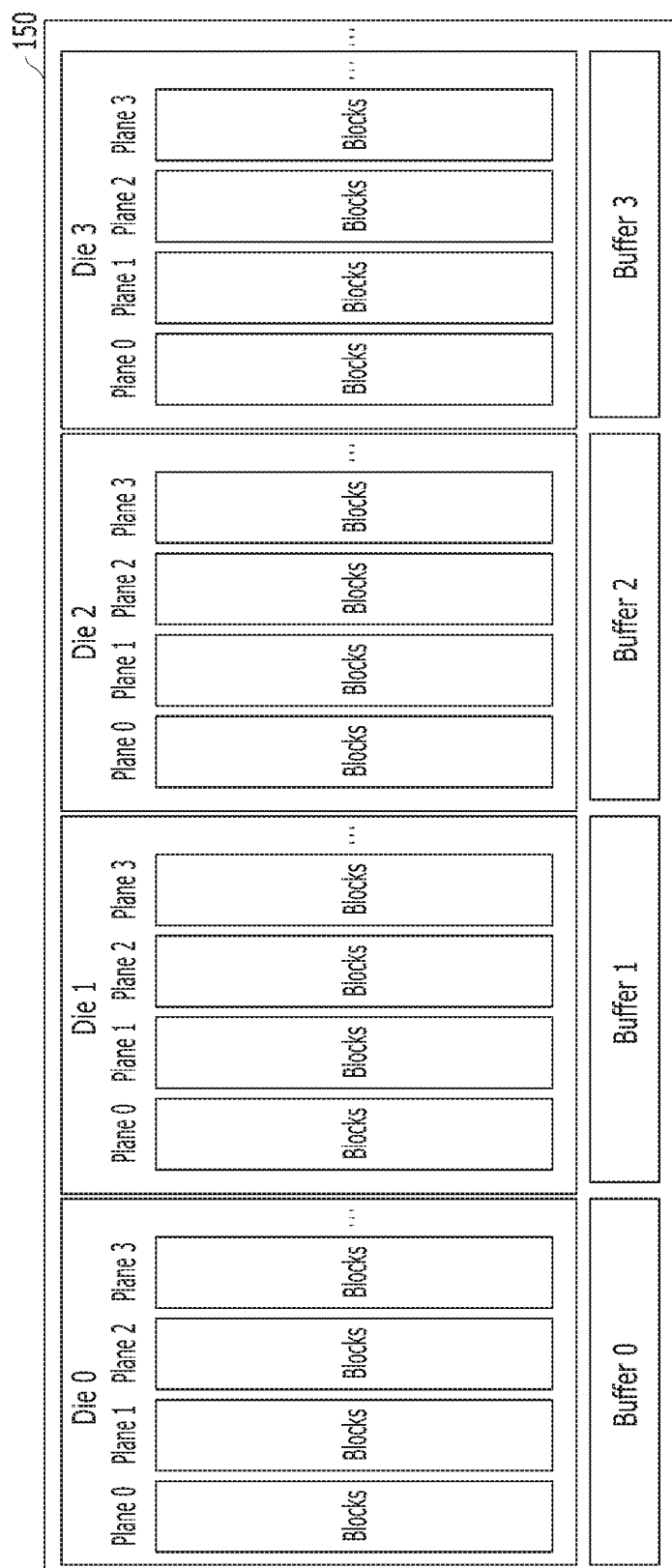

FIGS. 4 and 5 illustrate performing a plurality of command operations corresponding to a plurality of commands in the memory system in accordance with an embodiment of the disclosure. Detailed descriptions will be made for a data processing operation: when a plurality of write commands are received from the host 102 of FIG. 2 and program operations corresponding to the write commands are performed; when a plurality of read commands are received from the host 102 and read operations corresponding to the read commands are performed; when a plurality of erase commands are received from the host 102 and erase operations corresponding to the erase commands are performed; or when a plurality of write commands and a plurality of read commands are received together from the host 102 and program operations and read operations corresponding to the write commands and the read commands are performed.

Moreover, write data corresponding to a plurality of write commands from the host 102 are stored in a buffer/cache in the memory 144 of the controller 130, the write data stored in the buffer/cache are programmed to and stored in a plurality of memory blocks in the memory device 150, map data corresponding to the stored write data are updated in the plurality of memory blocks, and the updated map data are stored in the plurality of memory blocks in the memory device 150. In the embodiment of the disclosure, program operations corresponding to a plurality of write commands from the host 102 are performed. Furthermore, when a plurality of read commands are received from the host 102 for the data stored in the memory device 150, data corresponding to the read commands are read from the memory device 150 by checking the map data regarding the data corresponding to the read commands, the read data are stored in the buffer/cache in the memory 144 of the controller 130, and the data stored in the buffer/cache are provided to the host 102. In other words, read operations corresponding to a plurality of read commands from the host 102 are performed. In addition, when a plurality of erase commands are received from the host 102 for the memory blocks in the memory device 150, memory blocks are checked corresponding to the erase commands, the checked memory blocks are erased, map data are updated corresponding to the erased data, and the updated map data are stored in the plurality of memory blocks in the memory device 150. Namely, erase operations corresponding to a plurality of erase commands from the host 102 are performed.

Furthermore, when the controller 130 performs command operations in the memory system 110, as described above, the processor 134 in the controller 130 may perform command operations in the memory system 110, through a flash translation layer (FTL). Also the controller 130 programs and stores user data and metadata corresponding to write commands from the host 102, in arbitrary memory blocks among the plurality of memory blocks in the memory device 150. The controller 130 also reads user data and metadata corresponding to read commands from the host 102, from arbitrary memory blocks among the plurality of memory blocks in the memory device 150, and provides the read data to the host 102. Furthermore, the controller 130 also erases user data and metadata, corresponding to erase commands entered from the host 102, from arbitrary memory blocks among the plurality of memory blocks in the memory device 150.

Metadata may include first map data including logical/physical or logical to physical (L2P) information (hereinafter, referred to as 'logical information'), and second map data including physical/logical or physical to logical (P2L) information (hereinafter, referred to as 'physical information'), for data stored in memory blocks corresponding to a program operation. The metadata may include information on command data corresponding to a command from the host 102, information on a command operation corresponding to the command, information on the memory blocks of the memory device 150 for which the command operation is to be performed, and information on map data corresponding to the command operation. In other words, metadata may include plural information and data excluding user data corresponding to a command from the host 102.

In the embodiment of the disclosure, when the controller 130 receives a plurality of write commands from the host 102, program operations corresponding to the write commands are performed. In other words, user data corresponding to the write commands are stored in empty memory blocks, open memory blocks, or free memory blocks for which an erase operation has been performed, among the memory blocks of the memory device 150. Also, first map data and second map data are stored in empty memory blocks, open memory blocks, or free memory blocks among the memory blocks of the memory device 150. First map data may include an L2P map table or an L2P map list including logical information as the mapping information between logical addresses and physical addresses for the user data stored in the memory blocks. Second map data may include a P2L map table or a P2L map list including physical information as the mapping information between physical addresses and logical addresses for the memory blocks stored with the user data.

When write commands are received from the host 102, the controller 130 stores user data corresponding to the write commands in memory blocks. The controller 130 stores, in other memory blocks, metadata including first map data and second map data for the user data stored in the memory blocks. Particularly, corresponding to data segments of the user data stored in the memory blocks of the memory device 150, the controller 130 generates and updates the L2P segments of first map data and the P2L segments of second map data as the map segments of map data among the meta segments of metadata. The controller 130 stores the updated L2P and P2L segments in the memory blocks of the memory device 150. The map segments stored in the memory blocks of the memory device 150 are loaded in the memory 144 in the controller 130 and are then updated.

When a plurality of read commands are received from the host 102, the controller 130 reads read data corresponding to the read commands, from the memory device 150, stores the read data in the buffers/caches in the memory 144 of the controller 130. The controller 130 provides the data stored in the buffers/caches, to the host 102.

When a plurality of erase commands is received from the host 102, the controller 130 can check memory blocks of the memory device 150 corresponding to the erase commands and perform erase operations for the memory blocks.

When command operations corresponding to the plurality of commands from the host 102 are performed while a background operation is performed, the controller 130 loads and stores data corresponding to the background operation (that is, metadata and user data) in the buffer/cache in the memory 144. Then, the controller 130 stores the metadata and the user data in the memory device 150. By way of example but not limitation, the background operation may include a garbage collection operation or a read reclaim operation as a copy operation, a wear levelling operation as a swap operation or a map flush operation. For the background operation, the controller 130 may check metadata and user data corresponding to the background operation, in the memory blocks of the memory device 150. Further, the controller 130 may load and store the metadata and user data stored in certain memory blocks of the memory device 150, in the buffer/cache of the memory 144, and then store the metadata and user data, in certain other memory blocks of the memory device 150.

When performing command operations as foreground operations, and a copy operation, a swap operation and a map flush operation as background operations, the controller 130 schedules queues corresponding to the foreground operations and the background operations. Further, the controller 130 allocates the scheduled queues to the memory 144 in the controller 130 and the memory in the host 102. In this regard, the controller 130 assigns identifiers (IDs) by respective operations for the foreground operations and the background operations to be performed in the memory device 150. Further, the controller 130 schedules queues corresponding to the operations assigned with the identifiers, respectively. In accordance with the embodiment of the disclosure, identifiers are assigned not only by respective operations for the memory device 150 but also by functions for the memory device 150, and queues corresponding to the functions assigned with respective identifiers are scheduled.

In accordance with the embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In accordance with the embodiment of the disclosure, after memory regions corresponding to the queues scheduled by identifiers are allocated to the memory 144 and a memory in the host 102, the controller 130 manages addresses for the allocated memory regions. The controller 130 performs not only the foreground operation and the background operation but also respective functions and operations in the memory device 150, by using the scheduled queues.

Referring to FIG. 4, the controller 130 performs command operations corresponding to a plurality of commands from the host 102. For example, the controller 130 performs program operations corresponding to a plurality of write commands from the host 102. At this time, the controller 130 programs and stores user data corresponding to the write commands, in memory blocks of the memory device 150. Corresponding to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages in the memory blocks of the memory device 150. That is, the controller 130 generates and updates L2P segments as the logical segments of the first map data and P2L segments as the physical segments of the second map data. Then, the controller 130 stores the L2P and P2L segments in pages in the memory blocks of the memory device 150.

For example, the controller 130 caches and buffers the user data corresponding to the write commands from the host 102, in a first buffer 510 as a data buffer/cache of the memory 144. Particularly, after storing data segments 512 of the user data in the first buffer 510, the controller 130 stores the data segments 512 of the first buffer 510 in pages in the memory blocks of the memory device 150. As the data segments 512 are programmed to and stored in the pages of the memory blocks of the memory device 150, the controller 130 generates and updates the first map data and the second map data. The controller 130 stores the first map data and the second map data in a second buffer 520 of the memory 144. Particularly, the controller 130 stores L2P segments 522 of the first map data and P2L segments 524 of the second map data for the user data, in the second buffer 520 as a map buffer/cache. As described above, the L2P segments 522 and the P2L segments 524 may be stored in the second buffer 520 of the memory 144. A map list for the L2P segments 522 and another map list for the P2L segments 524 may be stored in the second buffer 520. The controller 130 stores the L2P segments 522 and the P2L segments 524, which are stored in the second buffer 520, in pages included in the memory blocks of the memory device 150.

The controller 130 performs command operations corresponding to a plurality of commands received from the host 102. For example, the controller 130 performs read operations corresponding to a plurality of read commands received from the host 102. Particularly, the controller 130 loads L2P segments 522 of first map data and P2L segments 524 of second map data as the map segments of user data corresponding to the read commands, in the second buffer 520. Further, the controller 130 checks the L2P segments 522 and the P2L segments 524. Then, the controller 130 reads the user data stored in pages of corresponding memory blocks among the memory blocks of the memory device 150, stores data segments 512 of the read user data in the first buffer 510, and then provides the data segments 512 to the host 102.

The controller 130 performs command operations corresponding to a plurality of commands entered from the host 102. For example, the controller 130 performs erase operations corresponding to a plurality of erase commands from the host 102. In particular, the controller 130 checks memory blocks corresponding to the erase commands among the memory blocks of the memory device 150 to carry out the erase operations for the checked memory blocks.

When performing an operation of copying data or swapping data among the memory blocks in the memory device 150, for example, a garbage collection operation, a read reclaim operation or a wear levelling operation, as a background operation, the controller 130 stores data segments 512 of corresponding user data, in the first buffer 510, and loads map segments 522, 524 of map data corresponding to the user data, in the second buffer 520. Then, the controller 130 performs the garbage collection operation, the read reclaim operation, or the wear levelling operation. When performing a map update operation and a map flush operation for metadata, e.g., map data, for the memory blocks of the memory device 150 as a background operation, the controller 130 loads the corresponding map segments 522, 524 in the second buffer 520, then performs the map update operation and the map flush operation.

As aforementioned, when performing functions and operations including a foreground operation and a background operation for the memory device 150, the controller 130 assigns identifiers by the functions and operations to be performed for the memory device 150. The controller 130 schedules queues respectively corresponding to the functions and operations assigned with the identifiers, respectively. The controller 130 allocates memory regions corresponding to the respective queues, to the memory 144 in the controller 130 and the memory in the host 102. The controller 130 manages the identifiers assigned to the respective functions and operations, the queues scheduled for the respective identifiers and the memory regions allocated to the memory 144 and the memory of the host 102 corresponding to the queues, respectively. The controller 130 performs the functions and operations for the memory device 150, through the memory regions allocated to the memory 144 and the memory of the host 102.

Referring to FIG. 5, the memory device 150 includes a plurality of memory dies. For example, the memory device 150 includes a memory die 0, a memory die 1, a memory die 2 and a memory die 3. Each of the memory dies includes a plurality of planes, for example, a plane 0, a plane 1, a plane 2 and a plane 3. The respective planes include a plurality of memory blocks. For example, each plane includes N number of blocks Block0 to BlockN−1. Each block includes a plurality of pages, for example, 2M number of pages. Moreover, the memory device 150 includes a plurality of buffers corresponding to the respective memory dies. For example, the memory device 150 includes a buffer 0 corresponding to the memory die 0, a buffer 1 corresponding to the memory die 1, a buffer 2 corresponding to the memory die 2 and a buffer 3 corresponding to the memory die 3.

When performing command operations corresponding to a plurality of commands from the host 102, data corresponding to the command operations are stored in buffers of the memory device 150. For example, when performing program operations, data corresponding to the program operations are stored in the buffers, and are then stored in pages of the memory blocks. When performing read operations, data corresponding to the read operations are read from the pages of the memory blocks, are stored in the buffers, and are then provided to the host 102 through the controller 130.

In the embodiment of the disclosure, while it will be described below as an example that the buffers of the memory device 150 exist outside the respective corresponding memory dies, it is to be noted that the buffers may exist inside the respective corresponding memory dies, and it is to be noted that the buffers may correspond to the respective planes or the respective memory blocks in the respective memory dies. Further, it is to be noted that the buffers may be a plurality of caches or a plurality of registers in the memory device 150.

The plurality of memory blocks in the memory device 150 may be grouped into a plurality of super memory blocks. Command operations may be performed in the plurality of super memory blocks. Each of the super memory blocks may include a plurality of memory blocks, for example, memory blocks included in a first memory block group and a second memory block group. When the first memory block group is included in the first plane of a certain first memory die, the second memory block group may be included in the first plane of the first memory die, may be included in the second plane of the first memory die or may be included in the planes of a second memory die.

In an embodiment of the disclosure, a data processing system may include a plurality of memory systems. Each of the plurality of memory systems 110 may include the controller 130 and the memory device 150. In the data processing system, one of the plurality of memory systems 110 may be a master and the others may be a slave. The master may be determined based on contention between the plurality of memory systems 110. When a plurality of commands is received from the host 102, the master may determine a destination for each command based at least on statuses of channels or buses. For example, a first memory system may be determined as a master memory system among a plurality of memory systems, corresponding to information delivered from the plurality of memory systems. If the first memory system is determined as the master memory system, the remaining memory systems are considered slave memory systems. A controller of the master memory system may check statuses of a plurality of channels (or ways, buses) coupled to the plurality of memory systems, to select which memory system handles commands or data received from the host 102. In an embodiment, a master memory system may be dynamically determined among the plurality of memory systems. In another embodiment, a master memory system may be changed with one of the other slave memory systems periodically or according to an event.

Hereinafter, a method and apparatus for transferring data in the memory system 110 including the memory device 150 and the controller 130 will be described in more detail. As the amount of data stored in the memory system 110 becomes larger, the memory system 110 may be required to read or store large amounts of data at a time. However, a read time for reading data stored in the memory device 150 or a program/write time for writing data in the memory device 150 may be generally longer than a handling time for the controller 130 to process data or a data transmission time between the controller 130 and the memory device 150. For example, the read time might be twice that of the handling time. Since the read time or the program time is relatively much longer than the handling time or the data transmission time, a procedure or a process for delivering data in the memory system 110 may affect performance of the memory system 110, e.g., an operation speed, and/or structure of the memory system 110, such as a buffer size.

Figure 6:
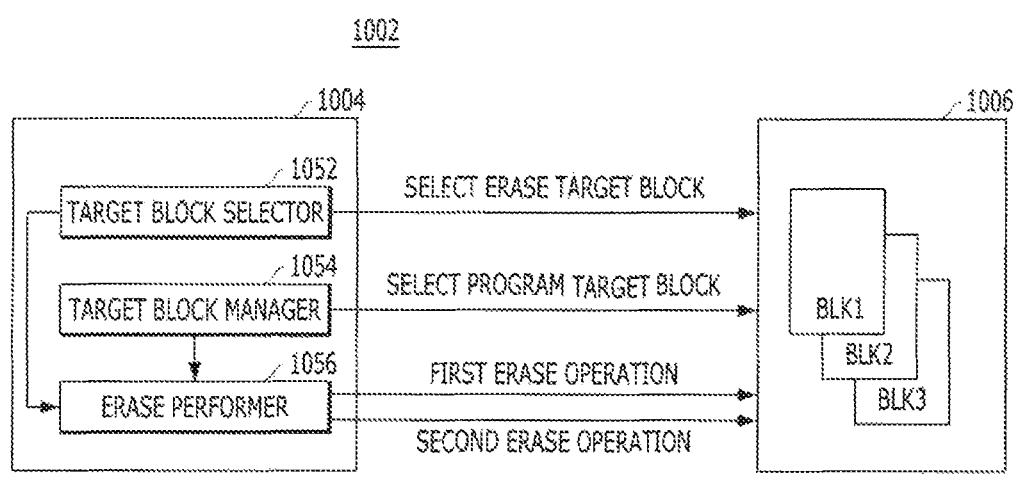
FIG. 6 illustrates a memory system according to another embodiment of the disclosure.

FIG. 6 illustrates a memory system according to another embodiment of the disclosure.

Referring to FIG. 6, the memory system 1002 may include a controller 1004 and a memory device 1006. The memory device 1006 may include a plurality of blocks BLK1, BLK2, BLK3 that may be erased (i.e., include invalid data). Although not shown, the memory device 1006 may include a plurality of blocks capable of storing data. The controller 1004 may include a target block selector 1052, a target block manager 1054, and an erase performer 1056.

In the controller 1004, the target block selector 1052 may determine whether to erase data included in at least one memory block among the plurality of blocks BLK1, BLK2, BLK3. At the first timing point, the target block selector 1052 may select blocks, which store invalid data, among the plurality of blocks BLK1, BLK2, BLK3 in the memory device 1006 as an erase target block. According to an embodiment, the controller 1004 may consider an erase target block, which includes programmed but no longer valid data, a free block which includes no data. The controller 1004 may determine that the erase target blocks containing programmed but no longer valid data can be assigned for a program operation.

Referring to FIG. 6, the target block selector 1052 may send information regarding an erase target block in the memory device 1006 to the target block manager 1054 and the erase operation performer 1056. In response to a program command, the target block manager 1054 receiving the information regarding the erase target block may select at least one block as a program target block among the erase target blocks at the second timing point. The program target block can include a memory block which is allocated for a following or a next program operation when a currently open memory block comes into a closed state. Herein, the program command may be transmitted from a host operatively engaged with the memory system 1002. According to an embodiment, the program command may include an internal program command generated for garbage collection or the like performed as a background operation. The controller 1004 may determine whether to use or when to newly program data in the program target block selected by the target block manager 1054. The target block manager 1054 may send information regarding at least one block determined as the program target block in the memory device 1006 to the erase performer 1056.

As described above, the target block selector 1052 and the target block manager 1054 included in the controller 1004 may perform operations of selecting the erase target block and the program target block respectively at the first and second timing points described with reference to FIG. 1.

The erase performer 1056, which receives information regarding the erase target block and the program target block determined by the target block selector 1052 and the target block manager 1054, can perform the first erase operation on the erase target block and the second erase operation on the program target block in the memory device 1006 based on the received information.

According to an embodiment, the controller 1004 may use the erase performer 1056 to perform a plurality of unit erase operations for erasing data stored or remaining in a selected block or a target block. The controller 1004 can split the plurality of unit erase operations into the first erase operation and the second erase operation. Particularly, unit erase operations included in the first erase operation, e.g., at least some of the plurality of unit erase operations, may be performed before the selected block is allocated for a program operation. For example, the controller 1004 may perform a unit erase operation for erasing data stored or remaining in the selected block after the first timing point, i.e., the selected block is considered the erase target block. However, although not shown, the erase operation may not occur until a specific block is again selected as the erase target block after the specific block is programmed with data at the third timing point.

In an embodiment, the controller 1004 may perform a first erase operation onto the erase target block selected by the target block selector 1052. In addition, the controller 1004 may perform a second erase operation onto the program target block selected by the target block manager 1054. The program target block may be included in the erase target block onto which the first erasing operation has been performed, but the erase target block may not be considered the program target block.

Although not shown, the controller 1004 may further include an erase verification unit (not shown) configured to check whether the program target block has been erased. In the erase verification unit, the controller 1004 receives information regarding the program target block determined by the target block manager 1054 and checks whether the program target block has been erased.

As described above, according to an embodiment, the erase performer 1056 receiving information regarding the erase target block selected by the target block selector 1052 may perform the first erase operation onto the erase target block. In addition, the target block manager 1054 may transmit information regarding the program target block selected among the erase target blocks to the erase verification unit, to check whether the program target block is erased. If the program target block is not completely erased as a checking result recognized by the erase verification unit, the erase performer 1056 may perform a second erase operation onto the program target block.

On the other hand, if it is known in advance that the target block is not erased through the first erasing operation (for example, if the first erase operation is set to partially erase a specific memory block), the controller 1004 can perform the second erase operation without an erase verification when it is determined which memory block is assigned to the program target block. For example, the first erase operation may be set to partially erase a specific memory block. Further, the first erase operation may be terminated abnormally.

Figure 7A:
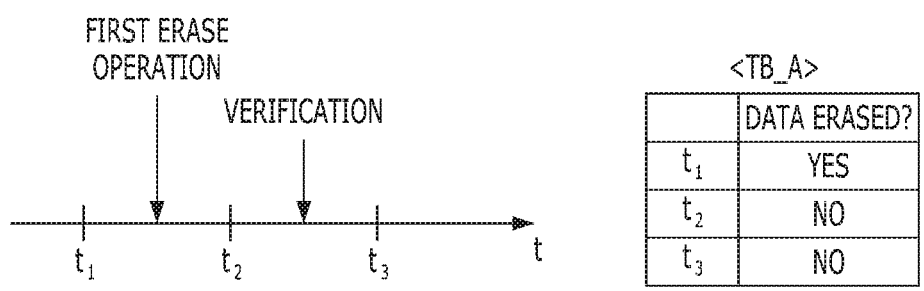
FIGS. 7A and 7B illustrate an erase operation according to an embodiment of the disclosure.

FIG. 7A illustrates an example of a change in presence or absence of data in a memory block according to an embodiment of the disclosure.

Referring to FIG. 7A, the presence or the absence of data in a specific memory block (i.e., whether the specific memory block is erased) is checked over time. In FIG. 7A, the x-axis indicates time. On the x axis, there are three timing points t1, t2, t3. At timing points t1, t2, t3 on the x-axis, it is possible to determine whether data stored or remaining in the specific memory block exists. Referring to a first table TB_A of FIG. 7A, data exists at a first timing t1 (Yes), no data exists at a second timing t2 (No), and no data exists at a third timing t3 (No).

Here, the presence or absence of data in the specific memory block may be distinguished from the erase verification performed by the controller 1004 shown in FIG. 6. The presence or absence of data shows a data status of specific memory block for describing an embodiment of the disclosure, which might not be determined through an operation of the controller 1004.

According to an embodiment, the first timing t1 may correspond to the first timing point described with reference to FIG. 1, the second timing t2 may correspond to the second timing point, and the third timing t3 may correspond to the third timing point. The controller 1004 may perform the first erase operation onto a specific memory block between the first timing t1 and the second timing t2. Data in a specific memory block exists at the first timing t1, but, as a result of the first erase operation, the data does not exist at the second timing t2. That is, the controller 1004 may erase the specific memory block through the first erase operation.

Meanwhile, for a program operation in response to a program command entered from the host, the controller 1004 may allocate a free block in which data has been erased through an erase operation among a plurality of memory blocks in the memory device 1006. According to an embodiment, the controller 1004 may perform an erase verification for checking whether the free block has been erased.

According to an embodiment, the controller 1004 may perform an erase verification for checking whether a specific memory block is erased between the second timing t2 and the third timing t3. A result obtained through the erase verification may indicate that there is no data in the specific memory block at both the second timing t2 and the third timing t3. That is, through the erase verification, the controller 1004 may recognize that the presence or absence of data stored or remaining in the specific memory block has been not changed between the second timing t2 and the third timing t3. In this case, when the controller 1004 recognizes that the specific memory block is erased after the second to third timings t2 to t3 or the third timing t3, the controller 1004 determines that it is not required to perform the second erase operation onto the specific memory block. That is, if the specific memory block is erased by the first erase operation before the specific memory block is allocated for newly programming data, it is not necessary to perform the second erase operation onto the specific memory block allocated for a program operation. Although not shown, intervals t1 to t2, t2 to t3 may be long or short and may be the same or different.

Although not shown, the controller 1004 performs an erase verification for checking that a specific memory block is erased between the second to third timings t2 to t3. When it is determined that the specific memory block is erased, the controller 1004 may perform a second erase operation onto the specific memory block.

Figure 7B:
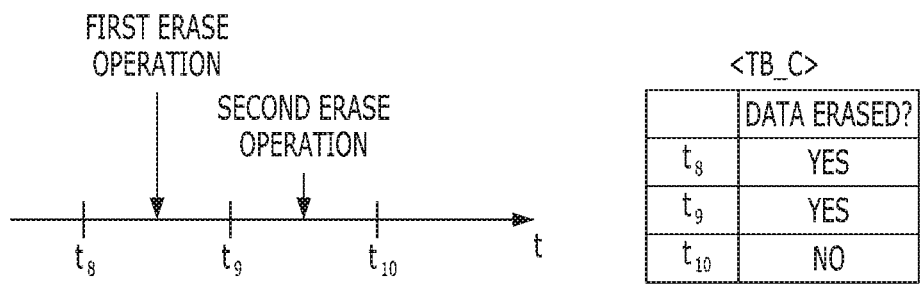

FIG. 7B illustrates another example of a change in the presence or absence of data in a specific memory block according to an embodiment of the disclosure.

The presence or the absence of data in a specific memory block (i.e., whether the specific memory block is erased) is checked over time. In FIG. 7A, the x-axis indicates time. On the x axis, there are three timing points t8, t9, t10. At timing points t1, t2, t3 on the x-axis, it is possible to determine whether data stored or remaining in the specific memory block exists. Referring to a third table TB_C of FIG. 7B, data exists at an eighth timing t8 (Yes), the data still exists at a ninth timing t9 (Yes), and no data exists at a tenth timing t10 (No).

According to an embodiment, the eighth timing t8 may correspond to the first timing point described with reference to FIG. 1, the ninth timing t9 may correspond to the second timing point, and the tenth timing t10 may correspond to the third time point. The controller 1004 may perform the first erase operation onto a specific memory block between the eighth timing t8 and the ninth timing t9. As a result of the first erasing operation, data still exists in the specific memory block at the eighth and ninth timings t8, t9. That is, all data included in the specific memory block may not be completely erased through the first erase operation.

The controller 1004 may allocate at least one memory block between memory blocks of which data has been erased through the first erase operation in the memory device 1006 to newly program data in response to a program command inputted from the host. According to an embodiment, when the first erase operation is set to partially erase a specific memory block, the controller 1004 does not perform an erase verification to check whether the specific memory block has been erased but does perform a second erase operation onto the specific memory block.

According to an embodiment, the controller 1004 may perform the second erase operation in a specific memory block between the ninth timing t9 and the tenth timing t10. As a result of the second erase operation, it may be shown that there is data in the block at the ninth timing t9 but no data exists at the tenth timing t10. That is, the second erase operation performed by the controller 1004 may erase the specific memory block completely. Also, the controller 1004 may perform a program operation for storing data onto the specific memory block in which data has been completely erased by the second erasing operation. Although not shown, intervals between the eighth timing t8 and the ninth timing t9, and between the ninth timing t9 and the tenth timing t10 may be long or short and may be the same or different.

Figure 8:
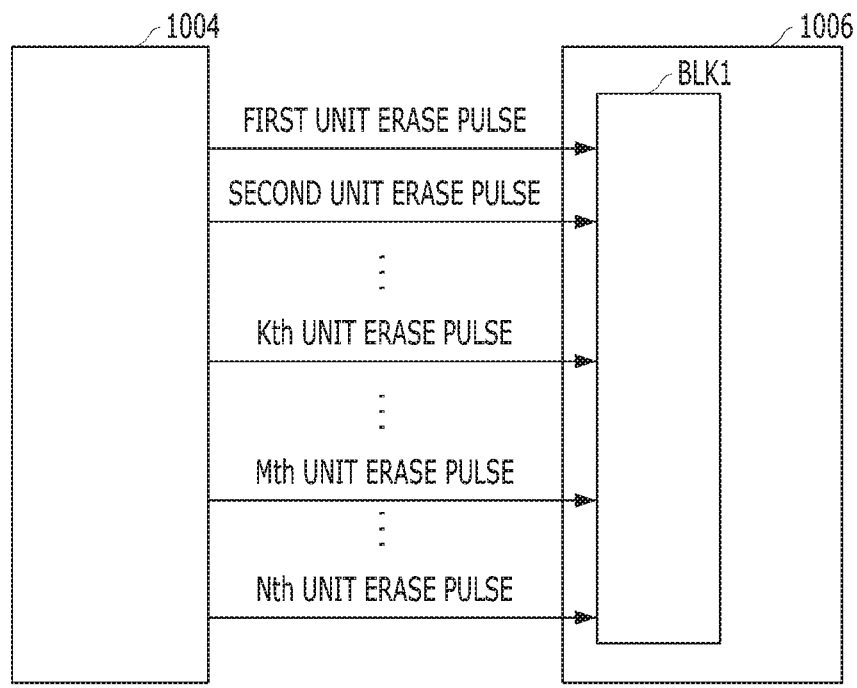
FIG. 8 is a diagram schematically illustrating unit erase operations according to an embodiment of the disclosure.

FIG. 8 is a view schematically showing a plurality of unit erase operations according to an embodiment of the disclosure.

Referring to FIG. 8, a memory system 1002 may include a controller 1004 and a memory device 1006. Although not shown, the memory device 1006 may include a plurality of memory blocks capable of storing data. Also, the memory device 1006 may include a first memory block BLK1 shown as an example where it is necessary to erase data which is no longer valid before new data is programmed therein.

Referring to FIG. 8, the controller 1004 may perform a plurality of unit erase operations, each for erasing a specific memory block with a predetermined time difference. The plurality of unit erase operations may be performed in response to a plurality of unit erase pulses (a first unit erasing pulse, a second unit erasing pulse, . . . , Nth unit erasing pulse) which are used for erasing data included in a specific memory block. Although not shown, the unit erase operation may include a verification pulse for checking an erase result after the unit erase pulse is supplied to the specific memory block. Herein, 'n' may be a natural number equal to or greater than 3.

In an embodiment, the controller 1004 may perform the first erase operation onto the first block BLK1. The first erase operation may include a plurality of unit erasing operations, and the plurality of unit erase operations may be individually performed by a plurality of unit erase pulses (e.g., the first unit erase pulse, the second unit erase pulse, . . . , $m^{th}$ unit erase pulse) which are supplied for erasing the first block BLK1. Meanwhile, each unit erase operation included in the first erase operation does not includes an erase verification performed in response to an erase verification pulse for checking an erasing result directly or immediately after each unit erase pulse (the first unit erase pulse, the second unit erase pulse, . . . , the $m^{th}$ unit erase pulse) are supplied into the first block BLK1. For example, the controller 1004 may generate the unit erase pulse to erase data included in the first block BLK1, but may not generate the erase verification pulse to check whether the data included in the first block BLK1 is erased in response to the unit erase pulse. It is assumed that $n^{th}$ unit erase operations are required to erase all data included in the first block BLK1 sufficiently. When the first erase operation may erase data included in the first block BLK1 through a plurality of unit erase pulses (the first unit erase pulse to $m^{th}$ unit erasing pulse, where m is a natural number less than n), it might be presumed that the data included in the first block BLK1 is not completely erased by $n^{th}$ unit erase operations so that it may not be necessary to verify whether the first block BLK1 has been erased.

In an embodiment, the controller 1004 may perform a second erase operation onto the first block BLK1. The second erase operation may include a plurality of unit erasing operations, and the plurality of unit erasing operations may include a plurality of unit erasing pulses (e.g., the first unit erase pulse, the second unit erase pulse, . . . , $k^{th}$ unit erase pulse) which are supplied for erasing the first block BLK1. Although not shown, the unit erase operation included in the second erase operation may include an erase verification performed in response to an erase verification pulse for checking an erase result immediately after the unit erase pulse (first unit erase pulse, second unit erase pulse, . . . , $k^{th}$ unit erase pulse) are supplied into the first block BLK1. For example, the controller 1004 may generate the unit erase pulse to erase data included in the first block BLK1 and the erase verification pulse to check whether the data included in the first block BLK1 is erased in response to the unit erase pulse. Herein, k may be a natural number less than m.

According to an embodiment, the controller 1004 may perform the unit erase operations included in the second erasing operation on the first block BLK1, in response to unit erase pulses having different widths or amplitudes. In response to an erase verification pulse used for checking an erase result of data included in the first block BLK1, the controller 1004 can generate another erase pulse having the same level or higher level as the current step when the first block BLK1 has not been erased. In the second erasing operation, a plurality of unit erase operations may be performed until the first block BLK1 is erased completely. When it is determined that the first block BLK1 is erased in response to a verification pulse confirming the erase result of data included in the first block BLK1, the controller 1004 may complete the second erase operation and no longer perform another unit erase operation.

Figure 9:
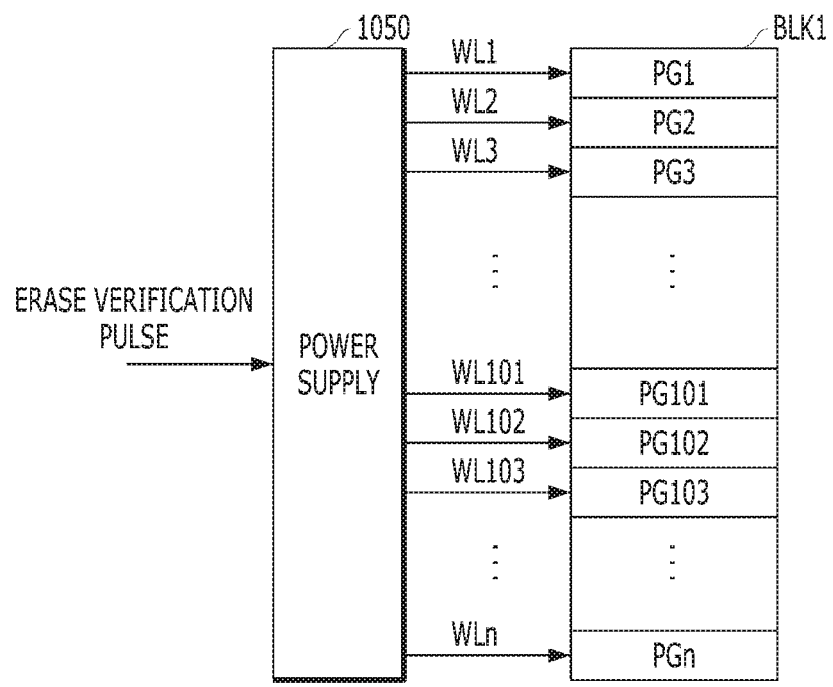
FIG. 9 is a diagram illustrating an operation for verifying an erase operation in accordance with an embodiment of the disclosure.

FIG. 9 illustrates an operation based on a pulse used for verifying whether a target block is erased in accordance with an embodiment of the disclosure. For example, the operation of FIG. 9 may be performed by the memory system 1002 including the controller 1004 and the memory device 1006 in FIGS. 1, 6 and 8.

Referring to FIG. 9, at least one pulse for verifying an erase result included in a sub erase operation is described. Although not shown, a power supply 1050 and a first block BLK1 may be included in the memory device 1006.

The power supply 1050 may receive an instruction associated with a pulse for verifying an erase result during the sub erase operation or checking an erase status. Each of plural pages PG1 to PGn of the first block BLK1 is connected to the power supply 1050 via each of plural word lines WL1 to WLn. The power supply 1050 may supply the pulse into each of the pages PG1 to PGn of the first block BLK1 via each of the word lines WL1 to WLn. A plurality of memory cells to which the pulse is applied via each word line may output a current flowing between source/drain of each memory cell. All data stored in each page of the memory cells may be read sequentially. Here, n may be natural number of 104 or more.

Depending on whether all data is erased in the memory cells in the page, the current flowing between the source and the drain may be varied when the pulse is supplied from the power supply 1050 through the word line. Thus, it is possible to verify whether the memory cells in the page stores data. For example, when a current supplied between the source and the drain is outputted, no data is stored in the memory cell. When a current supplied between the source and the drain is not outputted, data may be stored in the memory cell.

In accordance with an embodiment, the power supply 1050 is connected to each of the plural word lines WL1 to WLn. In response to the pulse for verifying the erase result of the sub erase operation, the power supply 1050 may supply a voltage into each of the plural pages PG1 to PGn of the first block BLK1.

By way of example but not limitation, the controller 1004 may check existence or absence of data, or a data default value, in a first page PG1 supplied with a voltage via the first word line WL1 by the power supply 1050. Then, the controller 1004 may check data in a second page PG2 supplied with a voltage via the first word line WL1 by the power supply 1050. The controller 1004 may check data in a third page PG3 by using a voltage supplied via the first word line WL1 from the power supply 1050. Sequentially, the controller 1004 may check data in the 101st page PG101 supplied with a voltage supplied from the power supply 1050 through the 101st word line WL101. The controller 1004 may check data in the 102nd page PG102 by using a voltage supplied from the power supply 1050 via the 102nd word line WL102. Then, the controller 1004 may check data in the 103rd page PG103 supplied with a voltage via the 103th word line WL103 by the power supply 1050. The controller 1004 may verify data in the n-th page PGn by using a voltage supplied via the n-th word line WLn from the power supply 1050.

A pulse for verifying the erase result is used to ensure whether a specific block is erased. A method for verifying whether the block is erased may be implemented in various embodiments. For example, before a first sub erase operation is performed, the controller 1004 may select an arbitrary page in the block, check whether the arbitrary page is erased, and sequentially verify data in a next page until finding any page having data which has not been erased. If the controller 1004 finds a page that has not been cleared of data, the controller 1004 may not need to check other pages anymore because the block is not erased. In an embodiment, the previously verified pages which do not store any data may be not verified additionally in the current or following sub erase operation. In the following sub erase operation, the controller 1004 may sequentially perform a verification from the page where data previously remains in the first sub erase operation.

Figure 10:
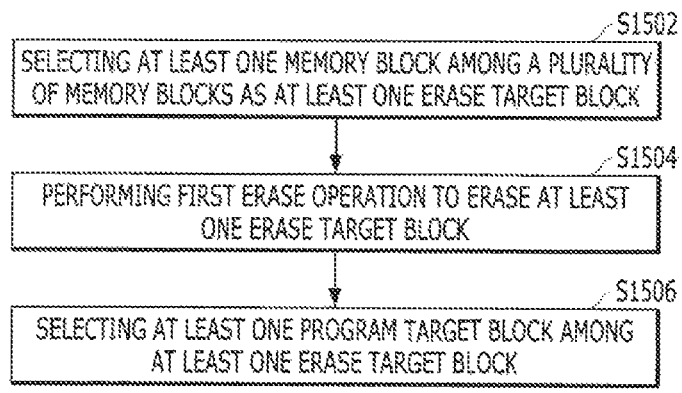
FIG. 10 is a flowchart illustrating an operating method of a memory system according to an embodiment of the disclosure.

FIG. 10 is a flowchart illustrating an operating method of a memory system according to an embodiment of the disclosure.

Referring to FIG. 10, a method of operating a memory system may include selecting at least one memory block among a plurality of memory blocks as at least one erase target block (S1502), performing a first erase operation to erase the at least one erase target block (S1504), and selecting at least one program target block among the at least one erase target block (S1506).

Generally, a memory system can, as necessary, erase data included or remaining in some memory blocks among a plurality of blocks in the memory system when the data is no longer valid. However, according to an embodiment, a memory system may perform an erase operation onto a target block two times, i.e., before and after it is determined that the target block is allocated for newly programming data. In particular, the erase operation may be performed as a background operation before the target block is allocated or assigned to newly program data, or regardless of whether the target block is allocated for a program operation. Accordingly, a delay caused by the erase operation for erasing data included in a plurality of blocks directly before the program operation can be reduced.

Plural blocks may be required to program a large amount of data. The program operation with a large amount of data may be delayed when the controller performs an erase operation on a memory block before the program operation to secure the plural blocks for the program operation. To reduce a delay, the controller performs the first erase operation onto at least one memory block including only data that is no longer valid, even if the at least one memory block is not allocated for the program operation. For example, the controller may perform the first erase operation in the absence of a command transmitted from the host.

According to an embodiment, the first erase operation may not check whether data included in a specific memory block is erased directly after trying to erase the data included in the specific memory block. Generally, an erase operation includes an operation of checking whether a specific memory block has been erased directly after the erase operation. However, when the first erase operation is set to partially erase a specific memory block, it may be presumed that the data has not been erased through the first erase operation and, thus, the controller does not check whether the data included in the specific memory block is erased directly after the first erase operation. When it is determined that the specific memory block is allocated for newly programming data, the second erase operation may be performed onto the specific memory block. In this embodiment, a time for performing the second erase operation, that is, the time required for erasing all data included in the specific memory block may be reduced due to the first erase operation. Thus, it is possible to avoid a delay in the program operation of a large amount of data due to a time spent on the erase operation for a plurality of memory blocks.

For example, the first erase operation includes 80 to 90% of an erase operation for erasing data included in a specific memory block, and the second erase operation including the remaining 10 to 20% of the erase operation may be performed when the specific memory block is allocated for a program operation. The numbers of unit erase operations included in each of the first erase operation and the second erase operation may be variously designed. For example, when the first erase operation includes a greater number of unit erase operations than the second erase operation, it may reduce a delay in the program operation more effectively.

When there are a plurality of erase target blocks including invalid data, the controller may arbitrarily determine a timing point when the first erase operation is performed onto each target block, regardless of a program operation. As described above, in a state in which there is no command inputted from the host or no background operation in the memory system, the controller determines which memory block the first erase operation may be performed onto, and then performs the first erase operation onto at least one memory block. The at least one memory block is a part of all but not all memory blocks which include data that is no longer valid. Also, the first erase operation may be performed later onto some blocks in which the first erase operation is not performed. For this operation, the controller may generate and refer to information indicating which memory block the first erase operation is performed onto among all memory blocks which include data that is no longer valid.

On the other hand, a timing point for performing the first erase operation may be different for each erase target block, but a timing point for performing the second erase operation may be substantially the same or sequential for each program target block after at least some of the erase target block is allocated as the program target block for a program operation. The second erase operation which is limited to a memory block allocated for newly programming a large amount of data, may be distinguished from the first erase operation which may be arbitrarily performed after data included in a memory block is no longer valid.

Figure 11:
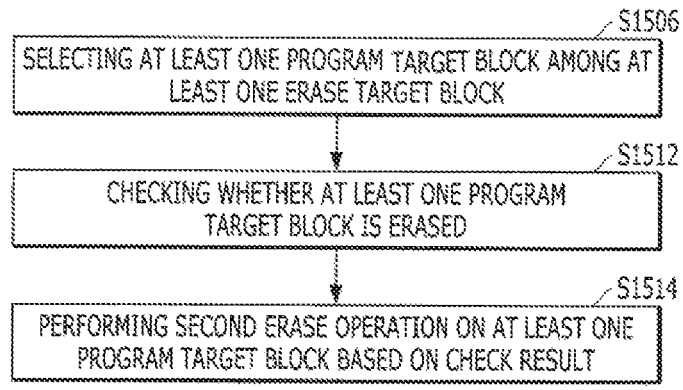
FIG. 11 is a flowchart illustrating an operating method of a memory system according to another embodiment of the disclosure.

FIG. 11 is a flowchart illustrating an operating method of a memory system according to another embodiment of the disclosure.

Referring to FIG. 11, the operating method may include, after selecting the at least one program target block among the at least one erase target block (S1506), checking whether the at least one program target block is erased (S1512), and performing a second erase operation on the at least one program target block based on a check result (S1514).

Because the first erase operation can erase almost all data remaining or stored in a specific memory block, it may be checked whether the data remaining or stored in the specific memory block is erased. When the specific memory block is erased, it might not be necessary to perform the second erase operation unnecessarily. Applying an erase pulse to a specific memory block having a nonvolatile memory characteristic when the erase operation is not necessary may adversely affect operating characteristics of memory cells in the specific memory block and may shorten a lifetime of the memory cells. Thus, before performing a program operation with data in the specific memory block, it may be beneficial for the memory system to verify whether data included in the specific memory block has been erased through the first erase operation, even though this takes time.

Figure 12:
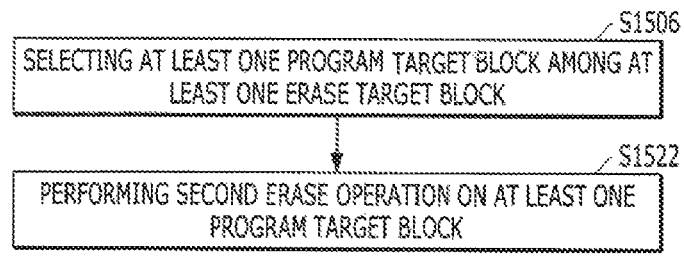
FIG. 12 is a flowchart illustrating an operating method of a memory system according to another embodiment of the disclosure.

FIG. 12 is a flowchart illustrating an operating method of a memory system according to another embodiment of the disclosure.

Referring to FIG. 12, the operating method may include performing a second erase operation on the at least one program target block (S1522) after selecting the at least one program target block among the at least one erase target block (S1506).

When the first erase operation is designed to partially erase a specific memory block, it may be presumed that the specific memory block is not completely erased through the first erase operation. Although the first erase operation is designed to partially erase the specific memory block, resources required for erasing the specific memory block can be divided into the first erase operation and the second erase operation, thereby reducing a delay caused by the erase operation performed onto at least one memory block directly before a program operation is performed with a large amount of data. In addition, since the first erase operation is designed to partially erase a specific memory block as described in FIG. 11, it might be unnecessary that a resource is consumed to check whether the specific memory block is erased after the specific memory block is determined to be used for a program operation.

Figure 13:
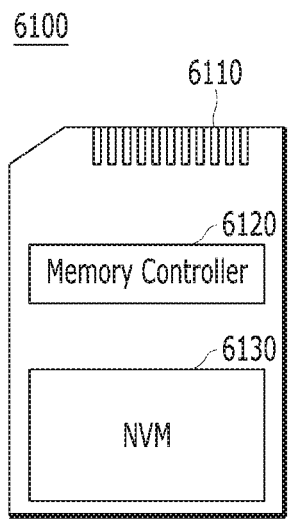
FIGS. 13 to 21 are diagrams schematically illustrating other data processing systems including a memory system in accordance with embodiments of the disclosure.

In FIG. 13, another example of the data processing system including the memory system in accordance with an embodiment is described. For example, FIG. 13 schematically illustrates a memory card system 6100 to which the memory system is applied.

Referring to FIG. 13, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By way of example and not limitation, the memory controller 6120 may be configured to control read, write, erase, and background operations of the memory device 6130. The memory controller 6120 may be configured to provide an interface between the memory device 6130 and a host, and use firmware for controlling the memory device 6130. That is, the memory controller 6120 may correspond to the controller 130 of the memory system 110 described with reference to FIG. 2, and the memory device 6130 may correspond to the memory device 150 of the memory system 110 described with reference to FIG. 2.

Thus, the memory controller 6120 may include a RAM, a processor, a host interface, a memory interface, and an error correction component. The memory controller 130 may further include the elements shown in FIG. 2.

The memory controller 6120 may communicate with an external device, for example, the host 102 of FIG. 2 through the connector 6110. For example, as described with reference to FIG. 2, the memory controller 6120 may be configured to communicate with an external device according to one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system may be applied to wired/wireless electronic devices, particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 2.

The memory controller 6120 and the memory device 6130 may be integrated into a single semiconductor device. For example, the memory controller 6120 and the memory device 6130 may be integrated to form a solid-state drive (SSD). In another embodiment, the memory controller 6120 and the memory device 6130 may be integrated to form a memory card such as a PC card (e.g., Personal Computer Memory Card International Association (PCMCIA) card), a compact flash (CF) card, a smart media card (e.g., a SM and a SMC), a memory stick, a multimedia card (e.g., a MMC, a RS-MMC, a MMCmicro and an eMMC), a secure digital (SD) card (e.g., a SD, a miniSD, a microSD and a SDHC) and/or a universal flash storage (UFS).

Figure 14:
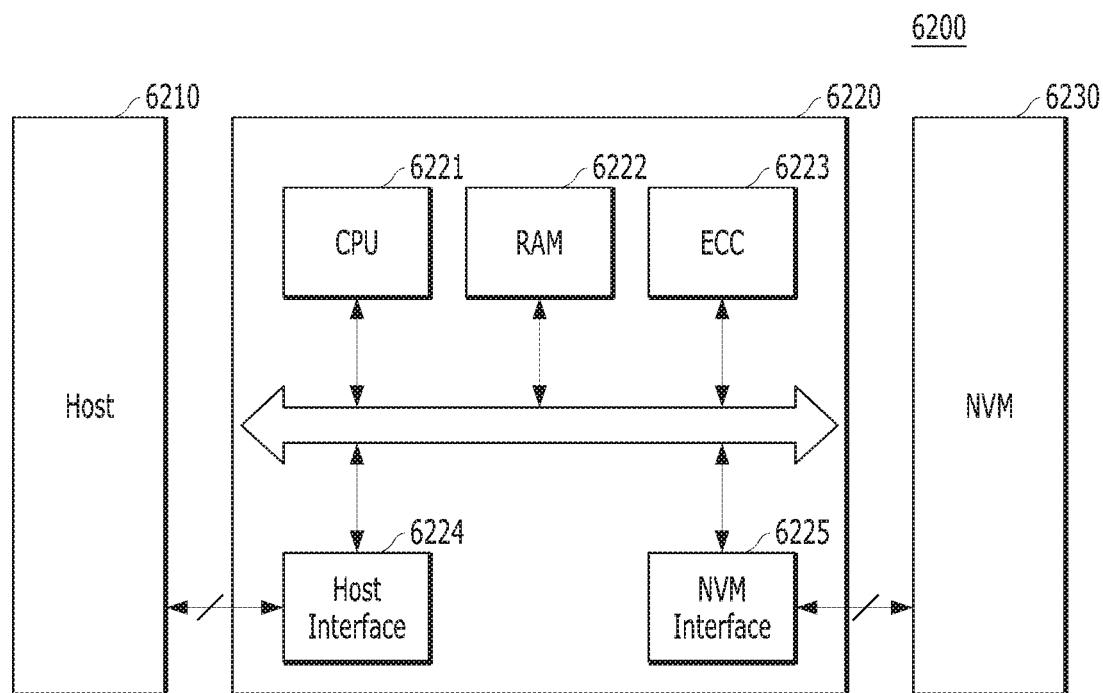

FIG. 14 is a diagram schematically illustrating a data processing system 6200 including the memory system in accordance with an embodiment.

Referring to FIG. 14, the data processing system 6200 may include a memory device 6230 having one or more nonvolatile memories (NVMs) and a memory controller 6220 for controlling the memory device 6230. The data processing system 6200 may serve as a storage medium such as a memory card (CF, SD, micro-SD or the like) or USB device, as described with reference to FIG. 2. The memory device 6230 may correspond to the memory device 150 in the memory system 110 illustrated in FIG. 2. The memory controller 6220 may correspond to the controller 130 in the memory system 110 illustrated in FIG. 2.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management, and bad page management operations. The RAM 6222 may be operated according to control of the CPU 6221. The RAM 6222 may be used as a work memory, buffer memory, or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 2. As described with reference to FIG. 2, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 2, the ECC circuit 6223 may correct an error using the LDPC code, BCH code, turbo code, Reed-Solomon code, convolution code, RSC or coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long-Term Evolution (LTE). The memory controller 6220 may be connected to an external device, for example, the host 6210 or another external device, and then exchange data with the external device. Particularly, as the memory controller 6220 is configured to communicate with the external device through one or more of various communication protocols, the memory system and the data processing system in accordance with an embodiment may be applied to wired/wireless electronic devices, particularly a mobile electronic device.

Figure 15:
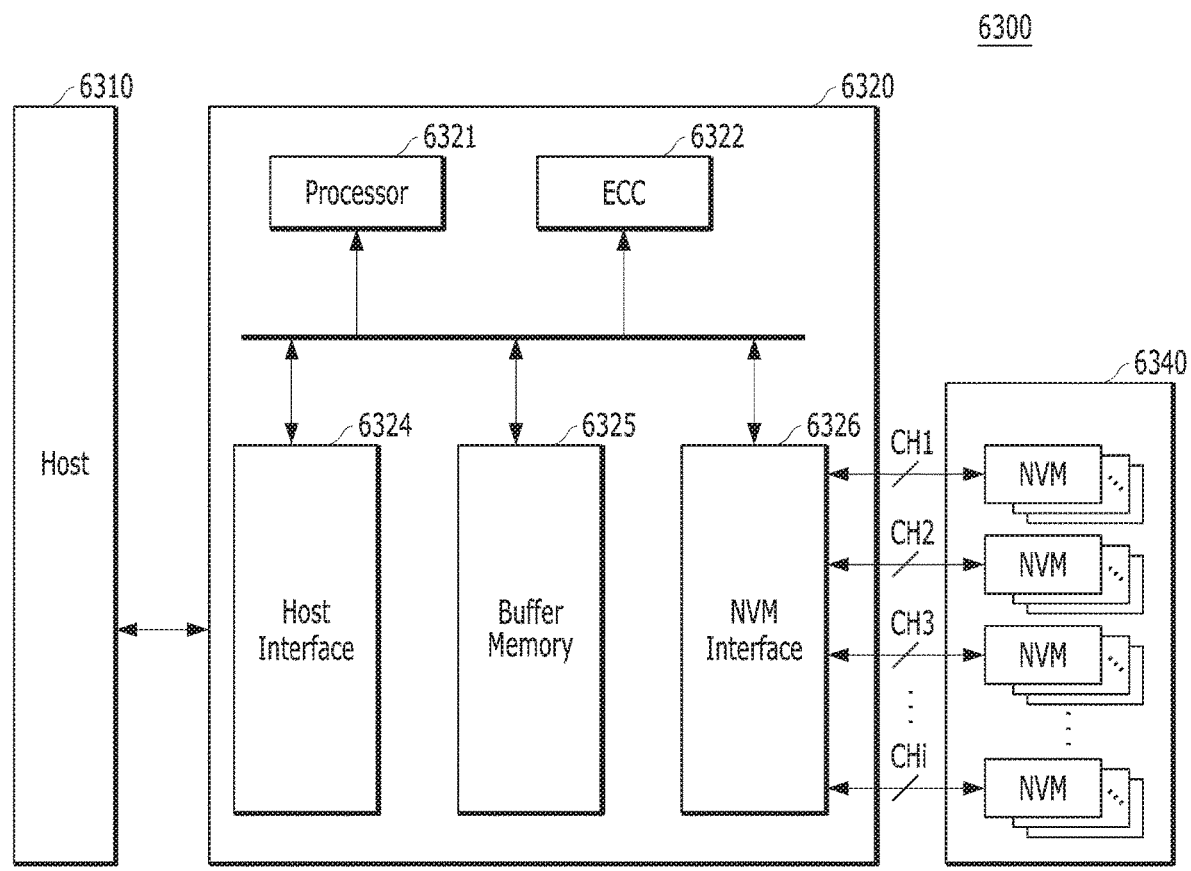

FIG. 15 is a diagram schematically illustrating another example of the data processing system including the memory system in accordance with an embodiment. For example, FIG. 15 schematically illustrates a solid-state drive (SSD) 6300 to which the memory system is applied.

Referring to FIG. 15, the SSD 6300 may include a controller 6320 and a memory device 6340 including a plurality of nonvolatile memories. The controller 6320 may correspond to the controller 130 in the memory system 110 of FIG. 2. The memory device 6340 may correspond to the memory device 150 in the memory system of FIG. 2.

Specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by various volatile memories such as DRAM, SDRAM, DDR SDRAM, LPDDR SDRAM and GRAM or nonvolatile memories such as FRAM, ReRAM, STT-MRAM and PRAM. FIG. 15 illustrates that the buffer memory 6325 is disposed in the controller 6320. However, the buffer memory 6325 may be disposed externally to the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIG. 2 is applied may be provided to embody a data processing system, for example, RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 16:
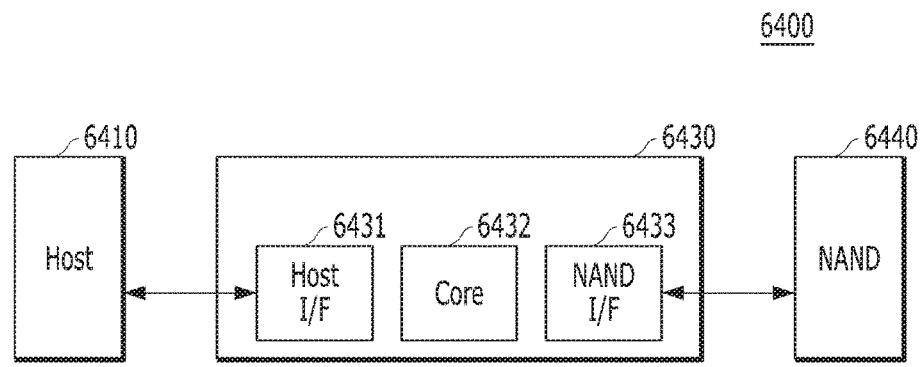

FIG. 16 is a diagram schematically illustrating another example of the data processing system including the memory system in accordance with an embodiment. For example, FIG. 16 schematically illustrates an embedded Multi-Media Card (eMMC) 6400 to which the memory system is applied.

Referring to FIG. 16, the eMMC 6400 may include a controller 6430 and a memory device 6440 embodied by one or more NAND flash memories. The controller 6430 may correspond to the controller 130 in the memory system 110 of FIG. 2. The memory device 6440 may correspond to the memory device 150 in the memory system 110 of FIG. 2.

Specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 2. Furthermore, the host interface 6431 may serve as a serial interface, for example, UHS ((Ultra High Speed)-I/UHS-II) interface.

FIGS. 17 to 20 are diagrams schematically illustrating other examples of the data processing system including the memory system in accordance with embodiments. For example, FIGS. 17 to 20 schematically illustrate universal flash storage (UFS) systems 6500, 6600, 6700, 6800 to which the memory system is applied.

Referring to FIGS. 17 to 20, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIG. 2. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 14 to 16, and the UFS cards 6530, 6630, 6730, 6830 may be embodied in the form of the memory card system 6100 described with reference to FIG. 13.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 17:
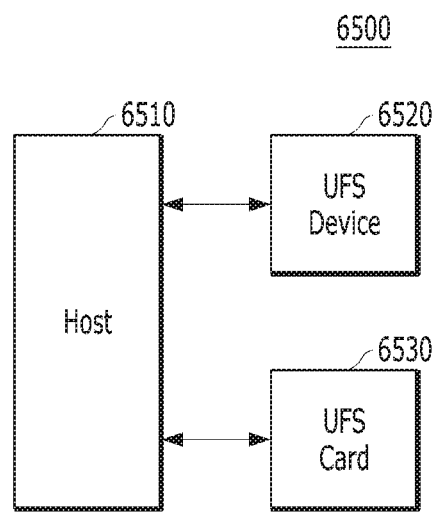

In the UFS system 6500 illustrated in FIG. 17, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the embodiment of FIG. 17, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6410. The form of a star is an arrangement where a single centralized component is coupled to plural devices for parallel processing. A plurality of UFS cards may be connected in parallel or in the form of a star to the UFS device 6520 or connected in series or in the form of a chain to the UFS device 6520.

Figure 18:
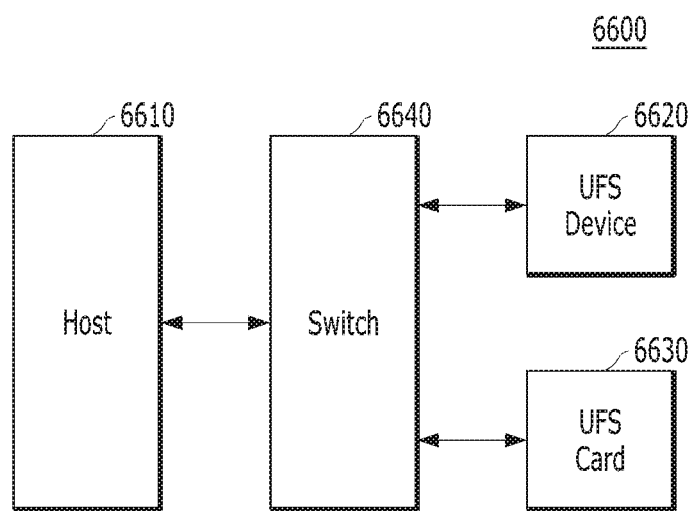

In the UFS system 6600 illustrated in FIG. 18, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 18, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 19:
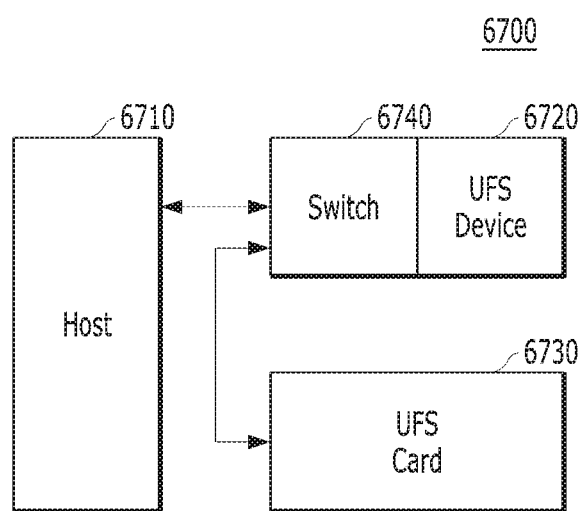

In the UFS system 6700 illustrated in FIG. 19, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the embodiment of FIG. 19, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 20:
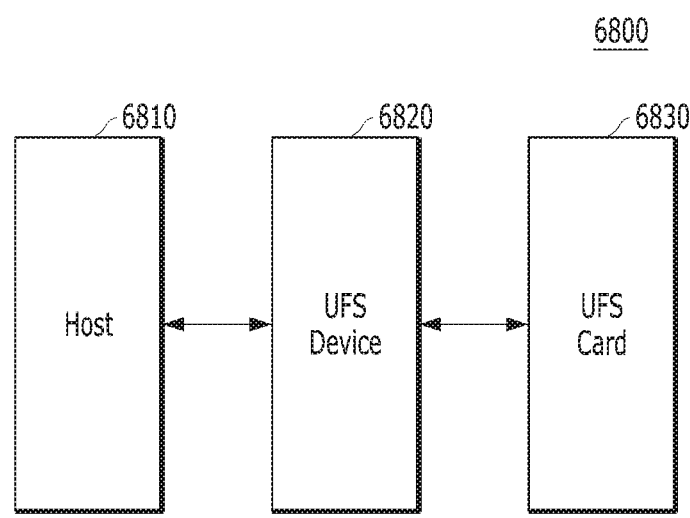

In the UFS system 6800 illustrated in FIG. 20, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY, and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the embodiment of FIG. 20, the configuration in which one UFS device 6820 is connected to the host 6810 and one UFS card 6830 is connected to the UFS device 6820 is illustrated by way of example. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 21:
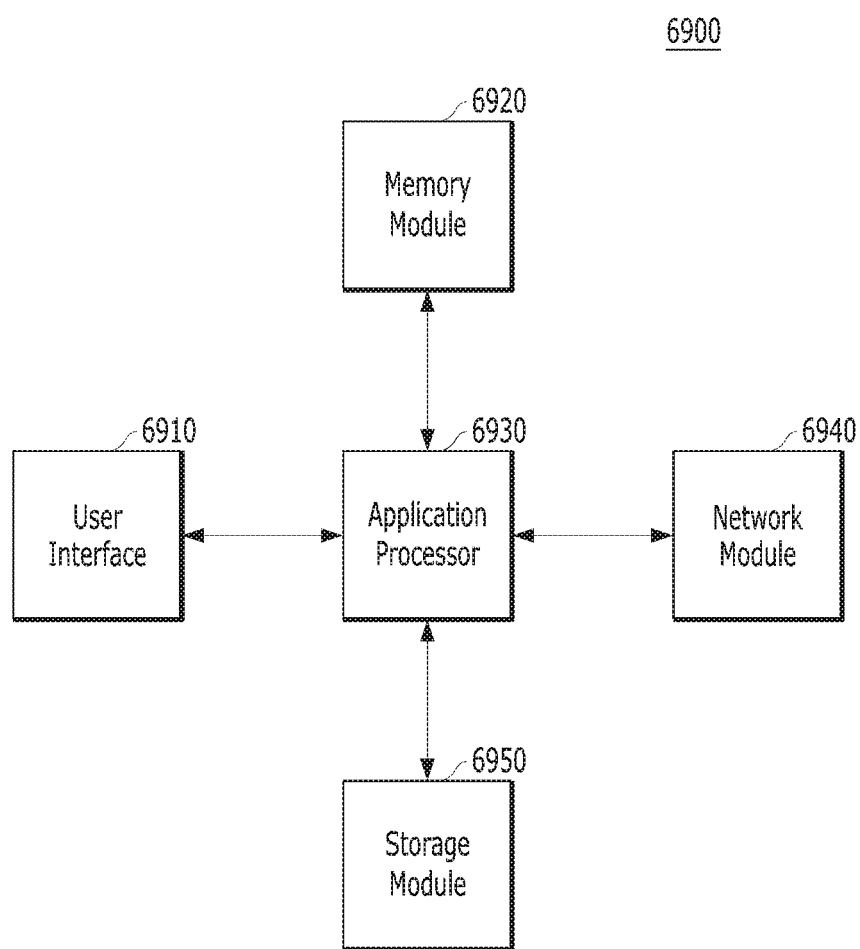

FIG. 21 is a diagram schematically illustrating another example of the data processing system including the memory system in accordance with an embodiment of the disclosure. For example, FIG. 21 is a diagram schematically illustrating a user system 6900 to which the memory system is applied.

Referring to FIG. 21, the user system 6900 may include an application processor 6930, a memory module 6920, a network module 6940, a storage module 6950 and a user interface 6910.

Specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory, or cache memory of the user system 6900. The memory module 6920 may include a volatile RAM such as DRAM, SDRAM, DDR SDRAM, DDR2 SDRAM, DDR3 SDRAM, LPDDR SDARM, LPDDR2 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the disclosure, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 2. Furthermore, the storage module 6950 may be embodied as an SSD, an eMMC and an UFS as described above with reference to FIGS. 13 to 21.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

According to embodiments of the disclosure, a memory system, a data processing system, a method of operating the same, and a method of checking an operation may perform at least some of unit erase operations, for erasing data no longer used in at least one specific memory block, regardless of whether or not a program operation with new data is performed onto the at least one specific memory block. An apparatus and a method for partially performing an erase operation to delete invalid data in advance before a program operation can have an advantage of avoiding or reducing a delay of the program operation even if the program operation is performed with a large amount of data onto a plurality of memory blocks.

In addition, embodiments of the disclosure can reduce time spent for an erase operation to erase a plurality of memory blocks directly before a program operation required to program a large amount of data is performed, thereby reducing time required to program a large amount of data, and reducing a haptic speed of I/O operation in the memory system. These advantages can increase marketability of the memory system.

While the disclosure has been illustrated and described with respect to specific embodiments, it will be apparent to those skilled in the art in light of the present disclosure that various changes and modifications may be made without departing from the spirit and scope of the invention as defined in the following claims.

What is claimed is:

1. A memory system, comprising:
 a memory device including a plurality of memory blocks for storing data; and
 a controller configured to perform an erase operation including plural unit erase operations to erase at least one target memory block included in the plurality of memory blocks,
 wherein the controller is configured to perform at least some of the plural unit erase operations onto the at least one target memory block before the at least one target memory block is allocated for storing data and perform the others of the plural unit erase operations onto the at least one target memory block after the at least one target memory block is allocated for storing data.

2. The memory system according to claim 1, wherein the controller does not perform an erase verification onto the at least one target memory block directly after performing the at least some of the plural unit erase operations.

3. The memory system according to claim 2, wherein the at least some of the plural unit erase operations is a first part of the erase operation.

4. The memory system according to claim 3, wherein the controller is configured to perform the erase verification to check whether the at least one target memory block is erased after the others of the plural unit erase operations is performed, wherein the first part of the erase operation is greater than the others of the plural unit erase operations in the erase operation.

5. The memory system according to claim 1, wherein the controller is configured to perform all of the plural unit erase operations onto the at least one target memory block before the at least one target memory block is allocated for storing data even when no command is entered from a host.

6. The memory system according to claim 5, wherein the controller does not perform an erase verification onto the at least one target memory block directly after performing all of the plural unit erase operations.

7. The memory system according to claim 5, wherein, after the at least one target memory block is allocated for storing data, the controller is configured to perform an erase verification onto the at least one target memory block and perform an additional unit erase operation when the at least one target memory block is not completely erased.

8. The memory system according to claim 1,
wherein the controller is configured to determine a first timing of the erase operation and a second timing of allocating the at least one target memory block for storing the data, and
wherein the first timing antecedes the second timing.

9. The memory system according to claim 1, wherein the controller is configured to individually determine a timing of the erase operation onto plural target memory blocks, and to allocate the plural target memory blocks for storing the data at the same time.

10. The memory system according to claim 1, wherein the controller is configured to stop performing the at least some of the plurality unit erase operations onto the at least one target memory block until the at least one target memory block is allocated for storing the data, when a power is not supplied from a host.

11. A controller in a memory system, comprising:
a target block selector configured to select at least one memory block among a plurality of memory blocks as at least one target block;
a target block manager configured to determine whether the at least one target memory block is used for storing data; and
an erase performer configured to perform an erase operation including a plurality unit erase operations to erase the at least one target memory block, the erase performer performing at least some of the plurality unit erase operations onto the at least one target memory block before the at least one target memory block is determined to be used for storing the data and performing the others of the plural unit erase operations onto the at least one target memory block after the at least one target memory block is determined to be used for storing data.

12. The controller according to claim 11, further comprising an erase state verifier configured to check whether the at least one target memory block is erased.

* * * * *